US012578186B2

(12) United States Patent
Kirby et al.

(10) Patent No.: US 12,578,186 B2
(45) Date of Patent: \*Mar. 17, 2026

(54) HIGH RESOLUTION OPTICAL DISPLACEMENT MEASUREMENT

(71) Applicant: Sarcos Corp., Salt Lake City, UT (US)

(72) Inventors: Richard Kirby, Heber City, UT (US); Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/201,608

(22) Filed: May 7, 2025

(65) Prior Publication Data

US 2025/0271257 A1 Aug. 28, 2025

Related U.S. Application Data

(63) Continuation of application No. 17/669,199, filed on Feb. 10, 2022, now Pat. No. 12,320,632.

(51) Int. Cl.
*G01B 11/27* (2006.01)
*G01B 11/00* (2006.01)
(Continued)

(52) U.S. Cl.
CPC .......... *G01B 11/272* (2013.01); *G01B 11/167* (2013.01); *G01L 1/24* (2013.01);
(Continued)

(58) Field of Classification Search
CPC ........ G01P 21/00; G01P 15/18; G01P 15/093; G01P 3/36; G01B 11/16; G01B 11/002;
(Continued)

(56) References Cited

U.S. PATENT DOCUMENTS 5,539,519 A * 7/1996 Takagi ............... G01D 5/34715
250/237 G
5,610,719 A * 3/1997 Allen ................... G01B 11/306
250/237 G (Continued)

FOREIGN PATENT DOCUMENTS

CN 103196376 A 7/2013
CN 107543500 A 1/2018
(Continued)

*Primary Examiner* — Peter J Macchiarolo
*Assistant Examiner* — Monica S Young
(74) *Attorney, Agent, or Firm* — Thorpe North & Western, LLP

(57) ABSTRACT

A compact displacement sensor comprises a light intensity pattern object, a micro-lens array and an imaging device including a light-intensity measuring surface. The micro-lens array is disposed between the light intensity pattern object and the imaging device such that each micro-lens focuses a corresponding sub-image making up a portion of the light-intensity pattern on the light-intensity measuring surface to create thereupon an image of the object comprising an array of focused sub-images. The displacement sensor can provide high resolution measurements of displacement of the light intensity pattern object from a reference position by registering subsequent images captured after a change in relative position between light intensity pattern object and the imaging device to a reference image based on pattern portions in the focused sub-images.

36 Claims, 14 Drawing Sheets

(51) Int. Cl.

| | |
|---|---|
| *G01B 11/16* | (2006.01) |
| *G01D 5/26* | (2006.01) |
| *G01L 1/24* | (2006.01) |
| *G01P 3/36* | (2006.01) |
| *G01P 15/093* | (2006.01) |
| *G01P 15/18* | (2013.01) |
| *G01P 21/00* | (2006.01) |
| *G06T 7/73* | (2017.01) |

(52) U.S. Cl.
CPC ................ *G01P 3/36* (2013.01); *G01P 15/18* (2013.01); *G06T 7/74* (2017.01); *G01B 11/002* (2013.01); *G01B 11/16* (2013.01); *G01D 5/26* (2013.01); *G01P 15/093* (2013.01); *G01P 21/00* (2013.01)

(58) Field of Classification Search
CPC ....... G01B 11/272; G01B 11/167; G06T 7/74; G01D 5/26; G01L 1/24
USPC ............................................ 73/800; 356/614
See application file for complete search history.

(56) References Cited

U.S. PATENT DOCUMENTS

| | | | | |
|---|---|---|---|---|
| 9,848,122 | B2 * | 12/2017 | Smith .................. | H04N 23/951 |
| 2005/0128594 | A1 * | 6/2005 | Hanson ................ | G01B 11/002 |
| | | | | 359/619 |
| 2007/0051884 | A1 * | 3/2007 | Romanov ................ | G01V 8/20 |
| | | | | 250/559.4 |
| 2009/0225305 | A1 * | 9/2009 | Hwang ................ | G01B 21/042 |
| | | | | 356/73 |
| 2012/0081543 | A1 * | 4/2012 | Tobiason ............... | G01B 11/00 |
| | | | | 348/E7.091 |

| | | | | |
|---|---|---|---|---|
| 2012/0106151 | A1 * | 5/2012 | Vissenberg .......... | G03B 21/005 |
| | | | | 362/244 |
| 2012/0140245 | A1 * | 6/2012 | Tobiason ............. | G01B 11/002 |
| | | | | 356/614 |
| 2012/0176629 | A1 * | 7/2012 | Allen ................. | G01D 5/34746 |
| | | | | 356/616 |
| 2013/0044315 | A1 | 2/2013 | Ahn et al. | |
| 2014/0362371 | A1 * | 12/2014 | Qiao .................. | G01N 21/8901 |
| | | | | 356/237.2 |
| 2016/0146600 | A1 * | 5/2016 | Taghavi Larigani .... | G01C 3/10 |
| | | | | 702/150 |
| 2017/0146338 | A1 * | 5/2017 | Allen ................... | G01B 11/161 |
| 2018/0080758 | A1 * | 3/2018 | Chen ................... | G01B 11/002 |
| 2018/0217510 | A1 * | 8/2018 | Wells .................. | G03F 9/7026 |
| 2018/0267214 | A1 * | 9/2018 | Rossi .................. | G02B 27/48 |
| 2020/0209729 | A1 * | 7/2020 | Chen ................... | G03B 17/02 |

FOREIGN PATENT DOCUMENTS

| | | | | | | |
|---|---|---|---|---|---|---|
| CN | 108548490 | A | * | 9/2018 | ............ | G06T 7/521 |
| CN | 109360246 | A | | 2/2019 | | |
| CN | 110926340 | A | | 3/2020 | | |
| CN | 115183920 | A | * | 10/2022 | .............. | G01L 1/24 |
| CN | 115752288 | A | * | 3/2023 | | |
| GB | 2501950 | A | * | 11/2013 | ............ | H04N 23/55 |
| JP | 2003222504 | A | | 8/2003 | | |
| JP | 2004-317375 | A | | 11/2004 | | |
| JP | 2004317376 | A | * | 11/2004 | | |
| JP | 2009250685 | A | * | 10/2009 | | |
| JP | 2012500989 | A | * | 1/2012 | ............ | G01D 5/38 |
| JP | 2015503110 | A | * | 1/2015 | ............ | G01B 11/30 |
| JP | 2015-083934 | A | | 4/2015 | | |
| KR | 20130020408 | A | * | 2/2013 | .......... | G01B 11/002 |
| WO | WO-2015182488 | A1 | * | 12/2015 | ............ | G02B 13/18 |
| WO | WO 2016/122404 | A1 | | 8/2016 | | |
| WO | WO-2024099660 | A1 | * | 5/2024 | .............. | G01D 5/38 |

* cited by examiner

EXTENSION ALONG X-AXIS

ROTATION ABOUT X-AXIS

HIGH RESOLUTION OPTICAL DISPLACEMENT MEASUREMENT

RELATED APPLICATIONS

This is a continuation application of U.S. application Ser. No. 17/669,199, filed Feb. 10, 2022, entitled "High Resolution Optical Displacement Measurement", which is incorporated by reference in its entirety herein.

BACKGROUND

Displacement sensors can support a wide variety of applications in which measurement of the size, length or amount of something can be calculated based at least in part on a displacement measurement. Displacement sensors find practical application being used to measure linear displacement and rotation angle, rate of linear displacement and rotation, force including multi-axes forces, torque, moments, strain, load, acceleration in one or more directions, inertia and pressure, among their many other practical applications.

BRIEF DESCRIPTION OF THE DRAWINGS

Features and advantages of the apparatus and method disclosed and taught herein will be apparent from the detailed description which follows, taken in conjunction with the accompanying drawings, which together illustrate, by way of example, features of the disclosed embodiments; and, wherein:

FIGS. 4A and 4B are ray diagrams of an optical element or elements that operate along one of the multiple optical axes in the micro-lens array in which FIG. 4A shows a ray diagram for a multi micro-lens element and FIG. 4B shows a ray diagram for a single micro-lens element according to an alternative embodiment;

DETAILED DESCRIPTION

Figure 1:
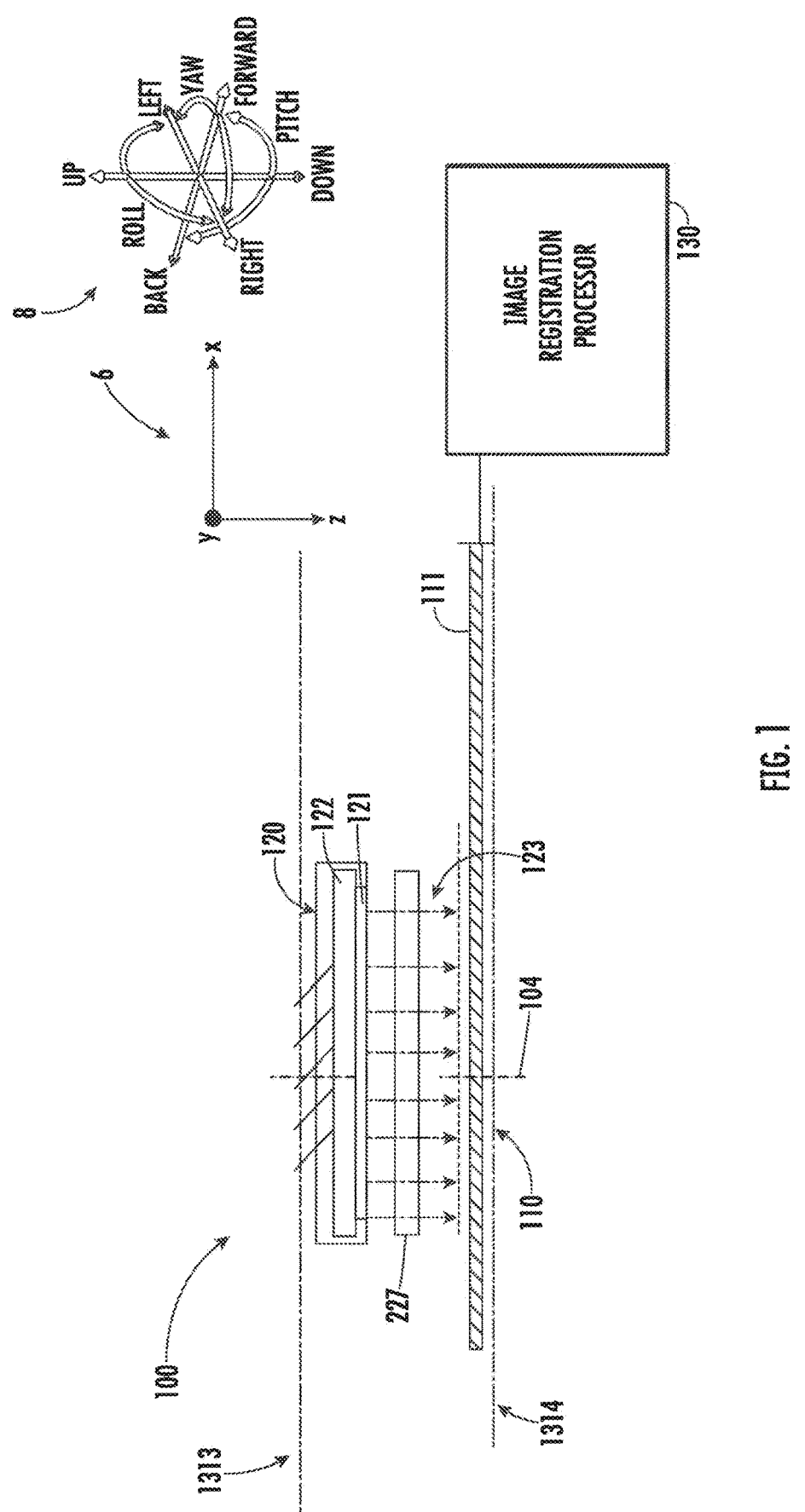
FIG. 1 is a side elevation view of a sensor according to embodiments and teachings herein.

In one embodiment, an apparatus for measuring displacement may include a light intensity pattern object, an imaging device including a light intensity measuring surface, and a micro-lens array. The micro-lens array may be disposed between the light intensity pattern object and the light intensity measuring surface such that each respective micro-lens of the micro-lens array views a corresponding, respective portion of the light intensity pattern object as a sub-image. Each micro-lens of the micro-lens array may focus each respective sub-image onto the light intensity measuring surface such that the micro-lens array forms upon the light intensity measuring surface an array of focused sub-images forming a sensed image of the light intensity pattern object. The imaging device may be configured to capture the sensed image and register the sensed image to a reference image of the light intensity pattern object based on light intensity pattern portions in the focused sub-images to thereby provide a measurement of displacement of the light intensity pattern object relative to the imaging device.

In some embodiments, the imaging device may be configured to register the sensed image to the reference image at least in part by an image registration algorithm that maps portions of the light intensity pattern in the focused sub-images to corresponding portions of the light intensity pattern in the reference image.

In some embodiments, the micro-lens array may be rigidly affixed to either the light intensity pattern object or the imaging device.

In some embodiments, the light intensity pattern object may include a pattern forming substrate defining a light intensity pattern. The light intensity pattern may be unique for each displacement of the light intensity pattern object relative to the imaging device such that an image registration processor produces a single displacement solution for each possible displacement.

In some embodiments, each respective sub-image may correspond to a central axis of a respective corresponding micro-lens in the micro-lens array such that each sub-image is spatially distinct from every other sub-image.

In some embodiments, the light intensity pattern object may include a light source that produces diffuse light and a mask that includes transparent regions and opaque regions. In some embodiments, the light intensity pattern object may include a UV light source and fluorescing material, wherein the UV light source may excite the fluorescing material. In some embodiments, the light intensity pattern object may include phosphorescence material. In some embodiments, the light intensity pattern object may include chemiluminescence material. In some embodiments, the light intensity pattern object may include at least a light emitting diode (LED) array or a quantum dot array. In some embodiments, the light intensity pattern object may include an array of light valves.

In some embodiments, the light intensity pattern object and the imaging device may be configured to measure a strain, a force, a torque, acceleration in one or more directions, a rate of rotation, a rotation angle, at least one of multi-axis forces or moments, or any combination thereof. In some embodiments, measurement of any of the above may be based on registering.

In one embodiment a method for measuring displacement includes forming an array of sub-images of a light intensity pattern object. The method may further include focusing the array of spatially distinct sub-images onto a light intensity measuring surface of an imaging device as an array of focused, spatially distinct sub-images forming a composite sensed image of the light intensity pattern object. The method may further include registering the composite sensed image to a reference image based on the focused, spatially distinct sub-images.

In some embodiments, registering may be performed by mapping pattern portions in the sub-images of the sensed image to corresponding pattern portions in corresponding sub-images of the reference image.

In one embodiment, an apparatus for measuring displacement includes an imaging device including a light intensity measuring surface, a light intensity pattern object, and an array of micro-lenses. The light intensity pattern object may be configured to propagate toward the light intensity measuring surface, a light intensity pattern characterized by variations in light intensity along a cross section defined by one or more axes of a light pattern object coordinate system. The array of micro-lenses may be disposed between the light intensity pattern object and the light intensity detecting surface such that each micro-lens in the array forms a sub-image of a corresponding portion of the light intensity pattern. The micro-lenses may focus the sub-images onto the light intensity measuring surface as an array of focused sub-images forming a sensed image of the light intensity pattern. Displacement of the light intensity pattern object can be determined by registering the sensed image to a reference image.

In some embodiments, the array of micro-lenses may be rigidly affixed to either the light pattern object or the imaging device.

In some embodiments, each micro-lens comprises at least two lenses aligned on the same optical axis.

In one embodiment, a method for measuring relative displacement includes focusing, using a plurality of lens elements, each lens element comprising one or more lenses and each lens element having a respective optical axis, a light intensity pattern onto a light intensity measuring surface of an imaging device to form an image of an object. The method may further include measuring displacement of the object with respect to the imaging device by registering the sensed image of the object to a reference image of the object based on the light intensity pattern.

In some embodiments, registering may include comparing a plurality of portions of the light intensity pattern in the sensed image to a plurality of corresponding portions of the light intensity pattern in a reference image of the object.

In some embodiments, the light intensity pattern may be produced using a light source that produces diffuse light and a mask that includes transparent regions and opaque regions. In some embodiments, the light intensity pattern may be produced using a UV light source and fluorescing material, wherein the UV light source excites the fluorescing material. In some embodiments, the light intensity pattern may be produced using phosphorescence material. In some embodiments, the light intensity pattern may be produced using chemiluminescence material. In some embodiments, the light intensity pattern may be produced using at least a light emitting diode (LED) array or a quantum dot array. In some embodiments, the light intensity pattern may be produced using an array of light valves.

The term 'displacement' refers to a change in position or orientation in space of object. An object can be any kind of tangible, material object, apparatus, structure or component. The term 'degrees of freedom' refers to the number of independent motions allowed to an object. A rigid free object has six degrees of freedom: three rotations and three translations about each perpendicular axis.

'Rigid displacement' refers to the displacement of an object where each point on the object experiences the identical displacement. Deformable displacement refers to the displacement of an object where each point on the object may experience different displacements.

Relative rigid displacement can refer to a displacement of a first object or structure relative to a second object or structure. The term 'relative deformable displacement' can refer to displacement of a first portion of a structure with respect to an initial position or orientation of the first structure, or with respect to a second portion of the structure that has undergone a different displacement. In that context, relative deformable displacement can be an indicator of, reversible and/or irreversible strain and/or structural damage.

The 'optical axis' of an optical system is the line around which there is some degree of rotational symmetry in an optical system. Traditional displacement measurement systems provide displacement measurements that can vary substantially in their resolution depending on the degree of freedom of motion allowed to sensor components and/or structures to which the sensor components are affixed. For example, single degree of freedom displacement sensors may provide displacement measurements with high resolution as compared to the resolution that could be provided in the absence of constraints on degrees of freedom of motion. Traditional multiple degree of freedom displacement sensors may provide measurements of displacement with high resolution in only one or two allowed degrees of freedom compared to the resolution that could be provided in other allowed degrees of freedom.

Prior art solutions include adding redundant sensors to achieve high resolution displacement measurements where displacement can occur as result of motion in more than one degree of freedom. However, this solution has a drawback in that redundant sensors can significantly increase size, complexity and/or cost of a displacement measuring device.

The sensor disclosed herein overcomes the disadvantages of prior art sensors by an arrangement and configuration of components that provides high resolution displacement measurements without increasing size, cost or complexity and without the need for redundant sensors to measure displacement of objects that can move with more than one degree of freedom.

FIG. 1 illustrates an example displacement sensor 100 embodying the teachings herein. As shown in FIG. 1, sensor 100 comprises a light intensity pattern object 120, a micro-lens array 227 and an imaging device 110 including a light intensity measuring surface 111.

Light intensity pattern object 120 serves as a 'proxy' target object, i.e., an object whose change in position and/or orientation is being determined by imaging device 110 to determine displacement of another object or structure to which light intensity pattern object 120 is rigidly affixed. Thus, light intensity pattern object 120 is an integral component of sensor 100. Light intensity pattern object 120 comprises one or more light sources 122 and a pattern forming substrate 121 configured as a multi-dimensional array 1855 of light intensity pattern portions (examples illustrated in FIGS. 2 and 3) that defines the light intensity pattern of light intensity pattern object 120.

Light intensity pattern object 120 emits light 123, which propagates generally along a longitudinal axis (z axis at 104) that is generally perpendicular to pattern forming substrate 121 in a relative spatial orientation of pattern forming substrate 121 and light measuring surface 111. Each respective light intensity pattern portion propagates light 123 in which the light intensity varies accordingly. In cross section, the light intensity varies according to the intensity pattern conferred by pattern-forming substrate 121.

In some embodiments, the light intensity measuring surface 111 can comprise an array of photo-sensing elements (an example illustrated in FIG. 5 at 1803), each of which responds in accordance with intensity of light to which it is exposed. In one embodiment, light intensity measuring surface 111 senses an image as an array of photo-sensor charge values that vary from one photo-sensing element to the next in accordance with corresponding light intensity patterns to which light intensity measuring surface 111 is exposed.

Micro-lens array 227 comprises an array of micro-lenses (an example illustrated in FIG. 2) disposed between light intensity pattern object 120 and light intensity measuring surface 111 of imaging device 110. Micro-lens array 227 is arranged with respect to light intensity pattern object 120 such that each respective micro-lens views a corresponding, respective portion of light intensity pattern object 120 as a sub-image. In that sense, micro-lens array 227 forms an array of sub-images. Micro-lens array 227 focuses the array of sub-images onto light-intensity sensing surface 111 of imaging device 110, forming thereon a sensed image of light intensity pattern object 120.

Imaging device 110 can capture images from light-intensity sensing surface 111 to produce a sequence of captured images over a time during which displacement occurs or may occur. Imaging device 110 provides at least a first captured image (the 'reference' image) to image registration processor 130 and at least a second captured image (the 'sensed' image). Image registration processor 130 measures displacement by registering (aligning) the sensed image to the reference image of light intensity pattern object 120.

In use, light intensity pattern object 120 can be rigidly affixed to a first structure 1313 and imaging device 110 including light measuring surface 111 can be rigidly affixed to a second structure 1314. In some embodiments first structure 1313 and second structure 1314 are separate structures, each of which has up to six degrees of freedom of motion (indicated at 8). In other embodiments first structure 1313 and second structure 1314 can be different structural portions of the same structure. Sensor 100 measures relative displacement of the first structure 1313 with respect to the second structure 1314 by measuring relative displacement of light intensity pattern object 120 with respect to imaging device 110.

In some embodiments sensor 100 includes a flexible support structure that facilitates relative movement between light intensity pattern object 120 and imaging device 110 in at least one degree of freedom so as to allow relative movement therebetween.

In some embodiments a substrate or mask is disposed on the support structure such that the support structure serves as pattern forming substrate 121 of light intensity pattern object 120. In one example, pattern forming substrate is coated with a material that fluoresces, or pattern forming substrate is made from a material that fluoresces, such that subjecting pattern forming substrate to light from a light source causes pattern forming substrate to excite and fluoresce (emit light), wherein light emitted from the pattern forming substrate comprises the light intensity pattern for light intensity pattern object 120.

In some embodiments, a light intensity pattern object 120 may include a mask that comprises opaque and transparent areas, i.e. light transmitting areas. In some embodiments the mask may be fabricated using lithographic processes such as those employed in the semiconductor fabrication industry. Light from a light source may pass through the transparent areas while being blocked by the opaque areas, forming a light intensity pattern.

In some embodiments, a light intensity pattern may be formed using one or more light emitting diode (LED) arrays. In some embodiments, the LED arrays may include organic LEDs (OLEDs). In some embodiments, a light intensity pattern may be formed using one or more quantum dot arrays. In some embodiments, a combination of LED arrays and quantum dot arrays may be used. In another embodiment the light intensity pattern may be formed by an array of light valves. The array of light valves may act as controllable shutters to selectively allow light to transmit through or to block the light. These valves can also allow some percentage of light through between entirely blocking light, in other words 0% transmissibility, and allowing all light, in other words 100% transmissibility. In one example, the light intensity pattern may be formed by a liquid crystal display (LCD). The LCD may use a back light and a layer of valves to control the light that is emitted per valve, and thus the light intensity pattern.

Figure 2:
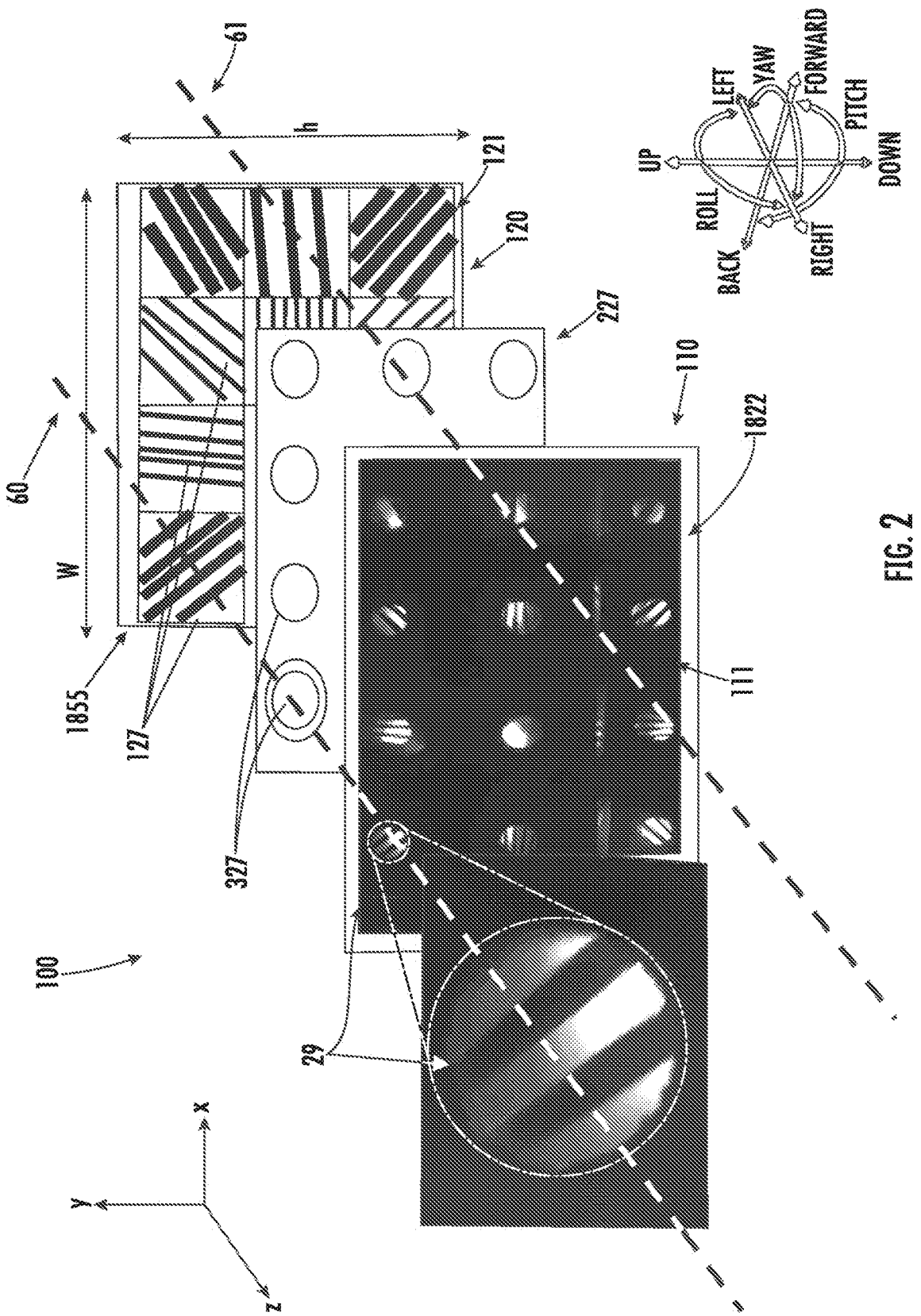
FIG. 2 is a pictorial view depicting an arrangement of components of the sensor illustrated in FIG. 1.

FIG. 2 shows more details of sensor 100 depicted in FIG. 1 to facilitate description of the configuration and cooperative interrelationship of sensor components. First, sensor 100 is configured such that each respective micro-lens of micro-lens array 227 defines a corresponding, respective micro-lens optical axis (representative examples depicted at 60 and 61). Accordingly, sensor 100 is a multi-optical-axis sensor. In contrast, conventional displacement sensors typically rely on a single optical axis lens system to focus an image of an object onto a light measuring surface. Sensor 100 provides an advantage over conventional single optical axis sensors. The multiple optical axes provided by micro-lens array 227 enable sensor 100 to be more compact than prior art sensors without sacrificing image quality. By maintaining a higher image quality, improved displacement measurement resolution may be achieved. An image quality may be defined by a point spread function of light patterns imaged on an imaging device, wherein a relatively higher image quality has a smaller point spread function than a relatively lower image quality. An image quality may be additionally or alternatively defined by an amount of blurring of edges, wherein relatively less blurring is associated with a relatively higher image quality than that of a relatively lower image quality. An image quality may be additionally or alternatively defined by an amount of image distortions, wherein relatively fewer image distortions and/or aberrations is associated with a relatively higher image quality than that of a relatively lower image quality.

In FIG. 1, imaging device 110 provides displacement measurements by registering a first image of light intensity pattern object 120 captured from light intensity measuring surface 111, to a second image of light intensity pattern object 120, which can be a reference image. To that end, imaging device 110 includes image registration processor 130. Image registration processor 130 is configured with an image registration or image alignment algorithm to spatially transform the first and second images to bring them into alignment. The spatial transformation provides a functional mapping that encodes a magnitude and direction of displacement of light intensity pattern object 120 with respect to imaging device 110 occurring between the time of capturing the sensed image (second image) and the time of capturing the reference image (first image.)

Suitable image registration techniques can include light intensity-based techniques, feature based techniques and combinations thereof. Light intensity-based techniques register the first and second images by comparing light intensity patterns, or sub-images in the first and second images via correlation metrics. If sub-images or pattern portions are highly correlated, they may be considered as corresponding to features or feature points of a sub-image. Feature based registration techniques seek correspondence of features such as points, lines, edges and contours in the first and second images. An 'edge' is a set of contiguous pixels (photo-sensing elements) along which an abrupt change in light intensity values occurs thereby defining a high intensity gradient in the sub-image.

Based on correspondence of distinguishable features in the first and second images, a geometrical transformation is determined that maps the first image to the second image based on the distinguishable features, thereby establishing point-by-point correspondence between the first and second images. Methods combining intensity-based and feature-based information can also be used. Image registration methods are well known in the art.

Regardless of registration method, the number and distribution of distinguishable features in the first and second images influences the accuracy of the registration. The more accurate the registration, the higher the resolution of the displacement measurement. Sensor 100 achieves high resolution displacement measurements at least in part by a configuration and cooperative arrangement of components that increases the number and distribution of distinguishable features in sensed images formed by light intensity measurement surface 111.

Returning again to FIG. 2, it can be seen that each micro-lens 327 defines a corresponding optical axis (examples indicated at 60, 61) that is spatially separated from the optical axes of remaining micro-lenses 327 making up the array 227. Each respective optical axis intersects light intensity pattern object 120 at a corresponding point on the surface of light intensity pattern object 120. Each point is spatially separated from every other point. Each micro-lens views a portion 127 of light intensity pattern object 120 about its own optical axis to form a corresponding spatially unique sub-image, or 'sub-view' of light intensity pattern object 120. Each sub-image formed by a given micro-lens may be at least partially spatially distinct from the sub-image formed by every other micro-lens. In some embodiments each sub-image does not overlap any other sub-image. In other embodiments, sub-images may overlap.

Micro-lens array 227 focuses each sub-image onto light intensity measuring surface 111 thereby exposing surface 111 to focused light intensity variations corresponding to pattern portions in each spatially distinct sub-image. In the photo-sensor array of light intensity measuring substrate 111, the focused light intensity variations produce more abrupt charge value transitions, compared to transitions that would be produced by unfocused sub-images.

In some embodiments, the light intensity pattern object 120 is designed such that there is enough irregularity in the pattern or uniqueness across portions of the pattern that the image registration algorithm does not confuse two different displacements. In this way, the image registration algorithm, executed by an image registration processor, produces a single displacement solution for each possible displacement.

Figure 6:
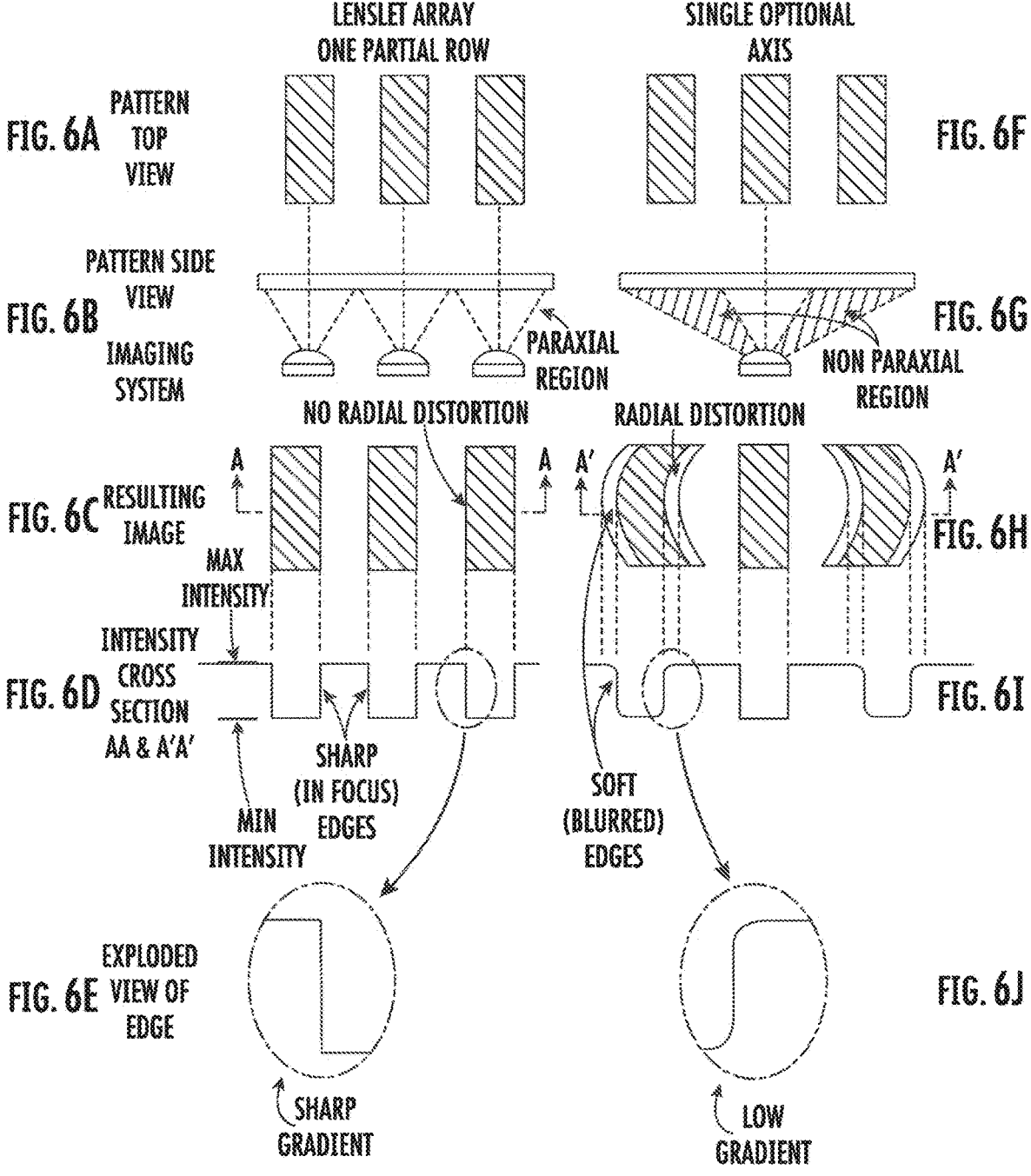
FIGS. 6A to 6J depict features of a light intensity pattern according to an example embodiment.

Spherical lenses produce higher quality images when the image is formed in the paraxial region of the lens, see, e.g., the paraxial regions depicted in FIGS. 6B and 6G. The resulting image in FIG. 6C from a micro-lens array does not show, or at least show to a much lesser extent, the optical aberrations of the resulting image in FIG. 6H from a single optical axis imaging system when the distance between the object plane and the image plane are the same. Two common optical aberrations are shown in FIG. 6H: blurring of edges and radial distortion. Sharp edges, such as the sharp transition between the light and dark regions shown in the resulting image in FIG. 6C, have high gradients, represented by the sharp edges included in the intensity plot shown in FIG. 6D and the exploded view in FIG. 6E, which produce higher resolution image registration. Gao et. al. mathematically proved that high gradients produce higher resolution image registration. (See Gao et. al. Displacement sensing and estimation theory and applications. *Applied Physics A,* 80(6), pp. 1265-1278.) Blurred edges, such as those shown in the region between the light and dark regions in FIG. 6H, have low gradients, represented by the soft, gradual transitions in the intensity plot shown in FIG. 6I and the exploded view in FIG. 6J, which substantially reduce the resolution of image registration. Additionally, the radial distortion changes the image as the pattern moves because different parts of the image have different amounts of radial distortion. This can be seen in FIG. 6H where the central portion of the image formed through the paraxial region does not show radial distortion, whereas the portion of the image formed outside the paraxial region shows radial distortion. Since the pattern can move relative to the image sensor, the radial distortion changes the shape of the image depending on where the pattern passes through the lens. This interferes with the image registration algorithm causing substantially lower resolution.

The example in FIG. 6A-6E shows one row of three lenses for the micro-lens array for clarity, however, a micro-lens array can consist of hundreds or thousands of lenses each imaging a small portion of the pattern. Thus, the field of view (the inverted triangle of dashed lines) shown in FIG. 6B would be very small, whereas the single optical axis system for the same object to image distance shown in FIG. 6G, would be many times (as many lenses in a row) larger. For example, if there are 100 lenses in a row of the micro-lens array and the field of view for the micro lens array were 1-degree, then the field of view for the single optical axis imaging system would be 100-degrees, which typically produces a highly distorted image with blurred edges. This is an effect well known to photographers. A 1-degree cone is well within the high image quality paraxial region of a spherical lens. In some embodiments, distortions, aberrations, and blurring associated with spherical lenses can be reduced through the use of aspherical lenses, however, even with aspherical lenses, radial distortion is improved by imaging through the paraxial region.

Figure 3:
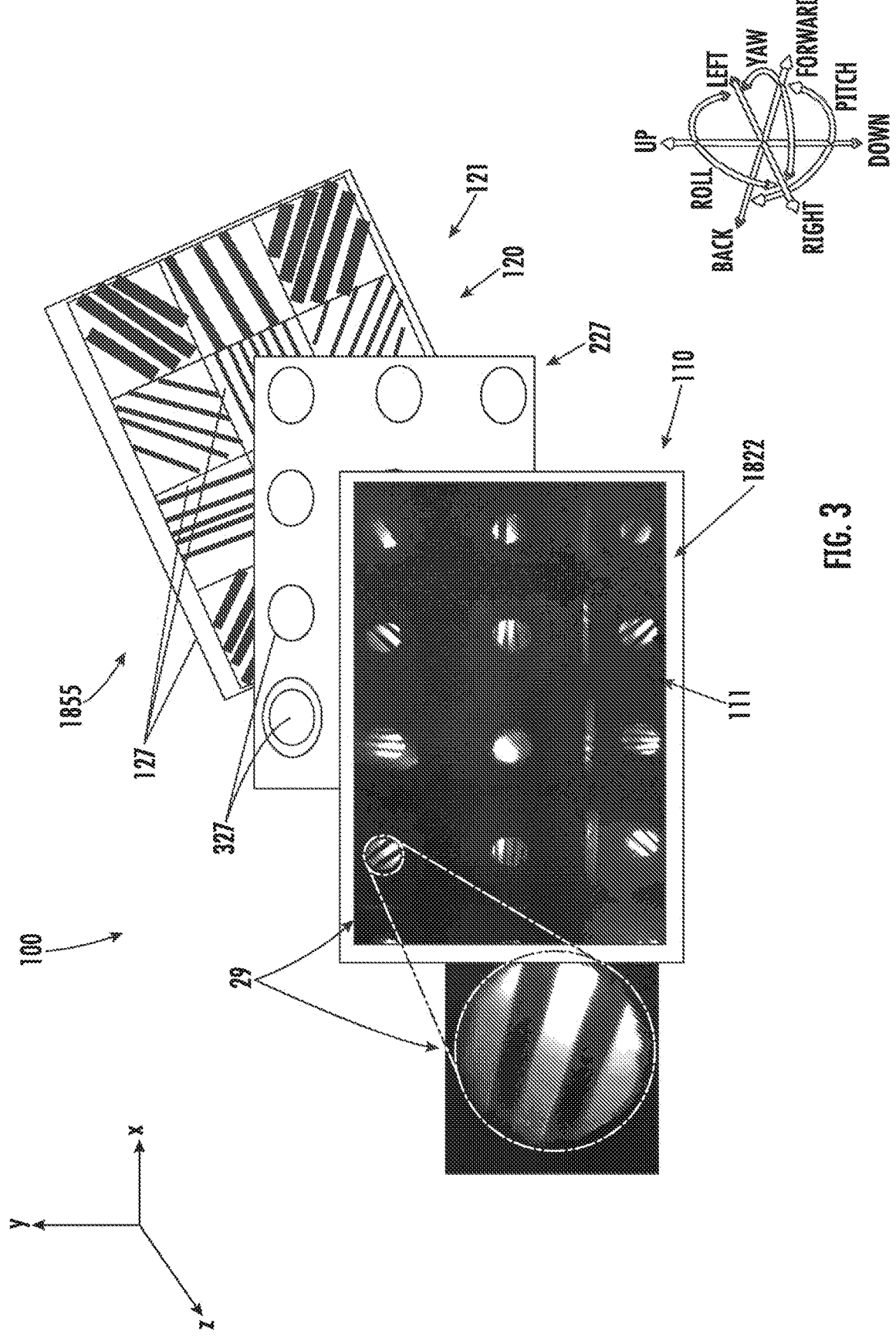
FIG. 3 is an example pictorial view depicting the arrangement of components of the sensor illustrated in FIG. 2, wherein a microlens array is coupled to an imaging device, after displacement of a light intensity pattern object with respect to the imaging device.

For convenience of illustration and discussion, FIGS. 2 and 3 depict a 4×3 array of light intensity pattern portions 127. It will be appreciated upon reading this disclosure that this is but one of many suitable array dimensions. In some embodiments the area (shown in FIG. 2 at 'w' and 'h') of pattern forming substrate 121 that is part of light intensity pattern object 120 overlaps in all directions the micro lens array 227 such that no matter how much displacement there is, the micro-lens array 227 still "sees" light intensity pattern that images upon light measuring surface 111. Thus, in an embodiment wherein the micro-lens array 227 is affixed to light measuring surface 111, the light intensity pattern needs to be larger than the micro-lens array 227 by the maximum desired displacement measurement.

FIG. 3 depicts sensor 100 after rotation about z-axis 104 of light intensity pattern object 120 relative to its position depicted in FIG. 2. When light intensity pattern object 120 is rotationally displaced with respect to light-measuring surface 111 as shown, the orientation of light intensity pattern portion (example portion 29 exploded view) on light-measuring surface 111 can change correspondingly. In the example shown in FIG. 3, after displacement the dark bars making up image element 29 (shown in exploded view) have changed their orientation on light-measuring surface 111 with respect to the orientation of the corresponding dark bars in image element 29 depicted in FIG. 2 (shown in exploded view).

Image registration processor 130 (shown in FIG. 1) can map the 'before image' (reference image) (corresponding to orientation of edges in image element 29 in FIG. 2) by their fixed positions on light intensity measuring surface 111 to the 'after image' (sensed image) (corresponding to orientation of edges in image element 29 in FIG. 3) by their fixed positions. The mapping or transformation of one set of fixed pixel positions to another can indicate magnitude and direction of the rotational displacement of light intensity pattern object 120.

Figure 4A:
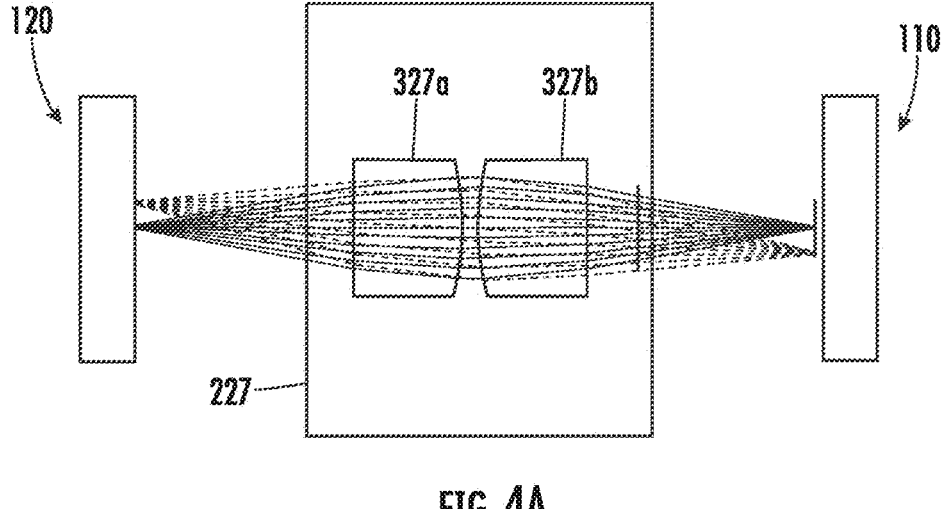
Figure 4B:
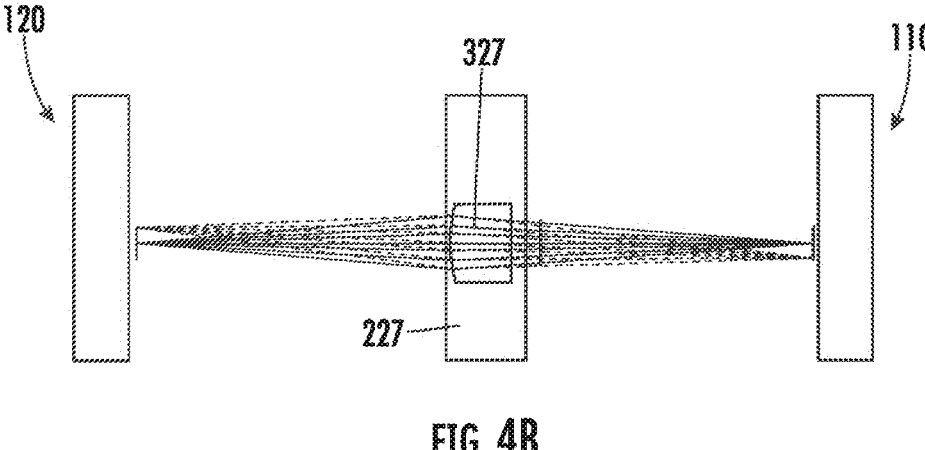

FIG. 4A is a ray diagram for an example double micro-lens element, also known as a doublet or more generally a compound lens, suitable for use in an embodiment of micro-lens array 227 in which each lens element in the array comprises two lenses as shown in FIG. 4A. FIG. 4B is a ray diagram for an example single micro-lens element, also known as a singlet, suitable for use in an embodiment of micro-lens array 227 in which each lens element in the array comprises a single lens. In other embodiments a collimator (not shown) or other optical component or components can be used to shape or direct light within or propagating from light intensity pattern object 120 in order to facilitate image registration.

Figure 5:
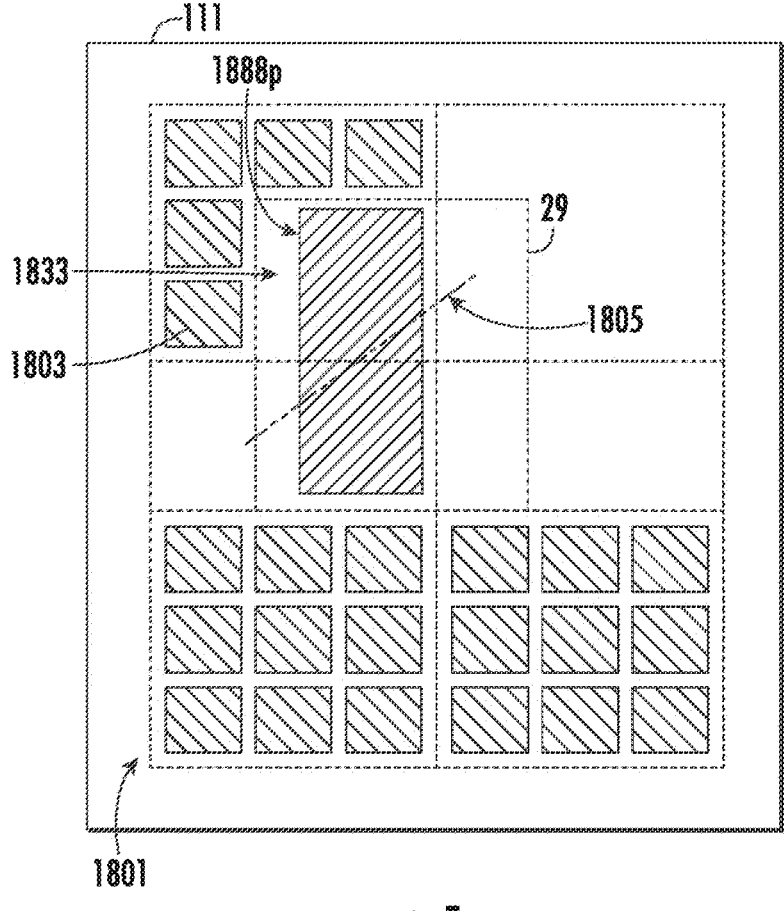
FIG. 5 depicts a light intensity measuring surface comprising photo sensing elements arranged for sensing a light intensity pattern comprising a matrix of sub-images corresponding to image elements according to embodiments and teachings herein.

FIG. 5 illustrates further details of light measuring surface 111 of imaging device 110. Light-measuring surface 111 comprises an array 1801 of photo-detector elements (example photo-detector indicated at 1803). Each photo-detector element 1803 in the array has a known fixed position on light measuring surface 111. The known fixed position can be specified by coordinates in a coordinate system of light-measuring surface 111.

Intensity patterned light impinges upon photo-detectors 1803 causing photo-detectors 1803 to respond to photon flux. In some embodiments, a charge-coupled device (CCD) or complementary metal oxide semiconductor (CMOS) detector array accumulates charge in accordance with the intensity of the impinging light and the duration of exposure of the photo detector 1803 to the photon flux. In a CCD imager embodiment, each p-doped MOS capacitor corresponds to a picture element (pixel) making up an image of light intensity pattern object 120.

The relative quantities of charges from one individual photo-detector to the next in array 1801 varies in accordance with variations in intensity of light across light intensity pattern object 120. Imaging device 110 captures an image of light pattern object 120 by 'reading' or measuring the charge levels of each photo-detector making up light measuring surface 111. Imager electronics convert the charge levels to a light intensity value. In the captured image, each photo detector element corresponds to a pixel that is specified by a light intensity value corresponding to the photo detector charge level and by coordinates defining a fixed position of the pixel (photo detector element) on light-measuring surface 111.

Although the above example embodiments were described using a CCD or CMOS detector array, other detectors are additionally or alternatively possible. For example, a photo conductor can be used to measure photon flux, wherein a conductance of the photo conductor varies as a function of photon flux impinging on the detector. As another example, reversed biases photodiodes vary the current flowing through the junction based on the photon flux (i.e. the intensity of the light impinging on the junction). As yet another example, photodiodes may also be used in the photo voltaic mode where information about the photo flux is captured as a current driving the diode in the forward direction.

In one example intensity measuring technique, the capacitors are biased above the threshold for inversion when light acquisition begins, allowing the conversion of incoming photons into electron charges at a semiconductor-oxide interface. In other implementations imaging device 110 can comprise an N-type metal-oxide-semiconductor (NMOS or Live MOS) type image sensor. Light measuring surface 111 of imaging device 110 can therefore comprise any suitable array of photo-sensitive or photo-detecting elements operable to sense light and charge to a level representative of the intensity of the sensed light, such as an imaging sensor typically found in digital cameras, cell phones, web cams, etc. The photo-sensing elements 1803 can be of any suitable size which will vary depending on implementation.

In some embodiments, each light intensity pattern portion (e.g., 127) of pattern forming substrate 121 includes at least one relatively light part and at least one relatively dark part to define at least one edge in each light intensity pattern portion 127. In the example pattern of FIGS. 2 and 3 each pattern portion 127 is defined by one or more black bars, each black bar defined by two edges. In some example embodiments, black patterns with non-parallel and/or curved edges can be used to address the loss of displacement sensitivity that may arise when displacement takes place along the edge of a parallel bar pattern. However, these are example embodiments. Those of ordinary skill will recognize a variety of suitable patterns as falling within the scope of this disclosure.

The pattern portions 127 extend along at least two axes of the coordinate system in which pattern-forming substrate 121 lies. Micro-lens array 227 focuses the pattern portions 127 onto light detecting surface 111 as a matrix of focused sub-images, the matrix extending along at least one axis of the light-measuring surface such that focused spatially distinct image portions are distributed substantially evenly across substantially the entire imaging area of light intensity measurement substrate 111. In some embodiments, the light intensity pattern within each pattern portion 127 is unique. For example, in array 1855 no two pattern portions are identical.

In some embodiments each pattern portion 127 included in array 1855 corresponds to a specific predetermined pattern that can be provided to imaging device 110 in advance of capturing images of light intensity pattern object 120 to measure displacement. Alternatively, one or more sensed images of light intensity pattern object 120 can serve as reference or orientation images. These can be provided as inputs to registration processor 130 (illustrated in FIG. 1). In some embodiments each pattern portion 127 is spatially unique and each pattern portion 127 is uniquely identifiable by imaging device 110 or registration processor 130 by a unique pattern or tag. Each of the different individually identifiable pattern portions can be known to the imaging device 110 or processor 130 and referenced for purposes of calibration or to measure displacement of the light intensity pattern object 120 from an initial calibration position and/or orientation.

In some embodiments, light intensity pattern object 120, micro-lens array 227 and imaging device 110 (and/or light-measuring surface 111) can be arranged to establish nominal relative initial positions. In those initial positions imaging device 110 can capture one or more reference images of light intensity pattern object 120. One or more of the reference images can be provided to image registration processor 130. Subsequently, imaging device 110 can capture a sequence of images of light intensity pattern object 120 over a time during which light intensity pattern object 120 may be displaced. The one or more reference images and the sequence of images during which light intensity pattern object 120 is displaced can be used to measure the displacement. In other embodiments, the reference image can be reset such that new one or more sensed images of light intensity pattern object 120 can serve as the new reference image.

Figure 7:
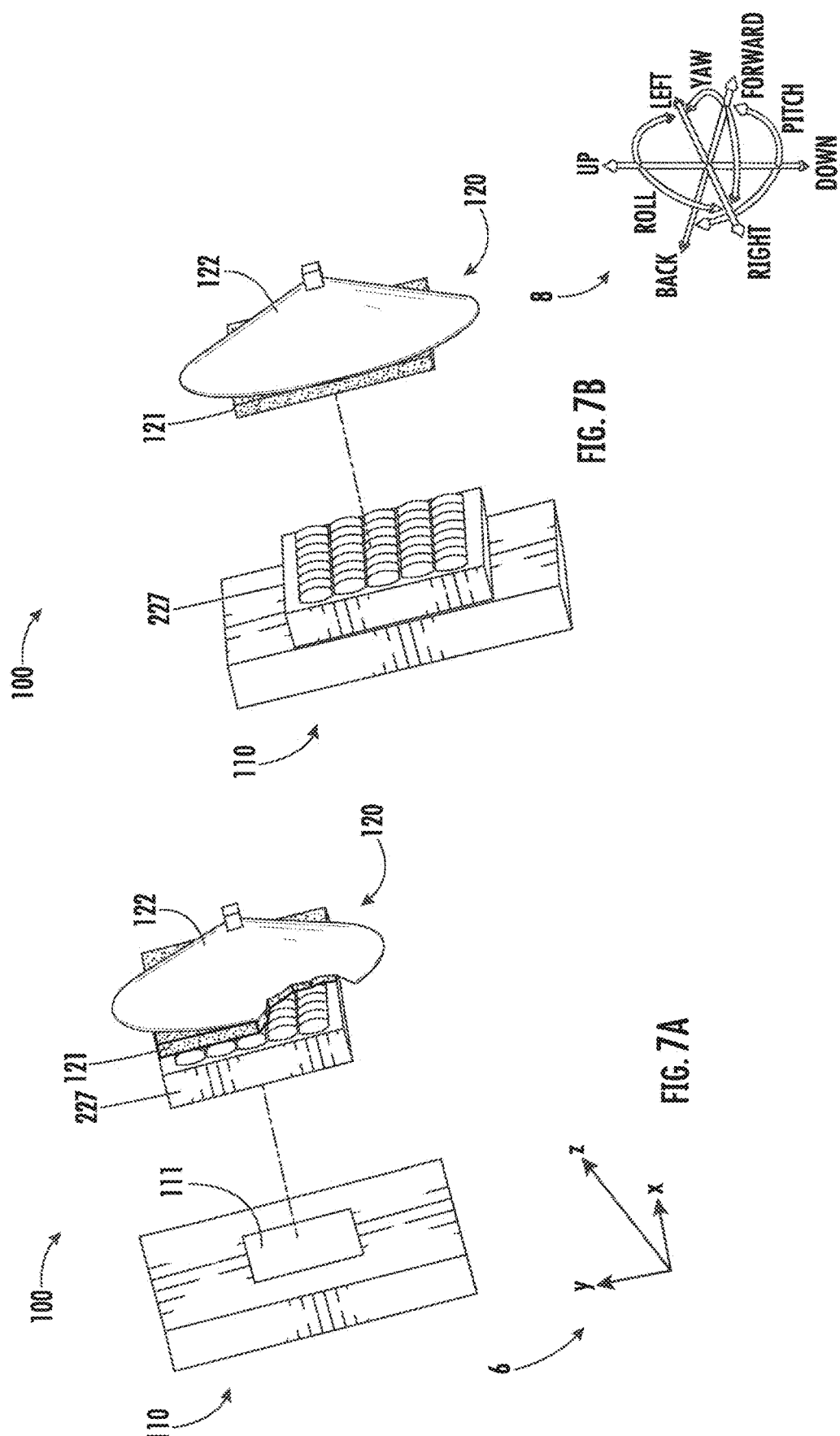
FIGS. 7A and 7B are pictorial diagrams depicting alternative arrangements of sensor components according to embodiments and teachings herein.

FIG. 7A is a perspective view of an embodiment of sensor 100 in which micro-lens array 227 is rigidly affixed to light intensity pattern object 120 (comprising pattern forming substrate 121 and light source 122). FIG. 7B is a perspective view of an alternative embodiment of sensor 100 in which micro-lens array 227 is rigidly affixed to imaging device 110. In either embodiment, pattern forming substrate 121 and light source 122 are fixed to one another. A structure, device, or mechanism may be employed to facilitate relative movement. Relative movement can be constrained to relative movement in only one or more selected degrees of freedom, such as translation only along the X axis and/or only rotation about the Z axis, etc. Any suitable arrangement of imaging device 110 and light intensity pattern object 120 that facilitates relative movement of imaging device 110 and light intensity pattern object 120 in one or more desired degrees of freedom is intended to fall within the scope of the disclosed embodiments and the appended claims.

In either of these embodiments components of sensor 100 can be configured as described above to provide high resolution displacement measurements for up to three translational degrees of freedom of movement of light intensity pattern object 120 and/or light-measuring surface 111 along the X, Y and Z axes (shown at 6) and up to three rotational degrees of freedom of movement of light intensity pattern object 120 and/or light-measuring surface 111 about the X, Y and Z axes.

Figure 8:
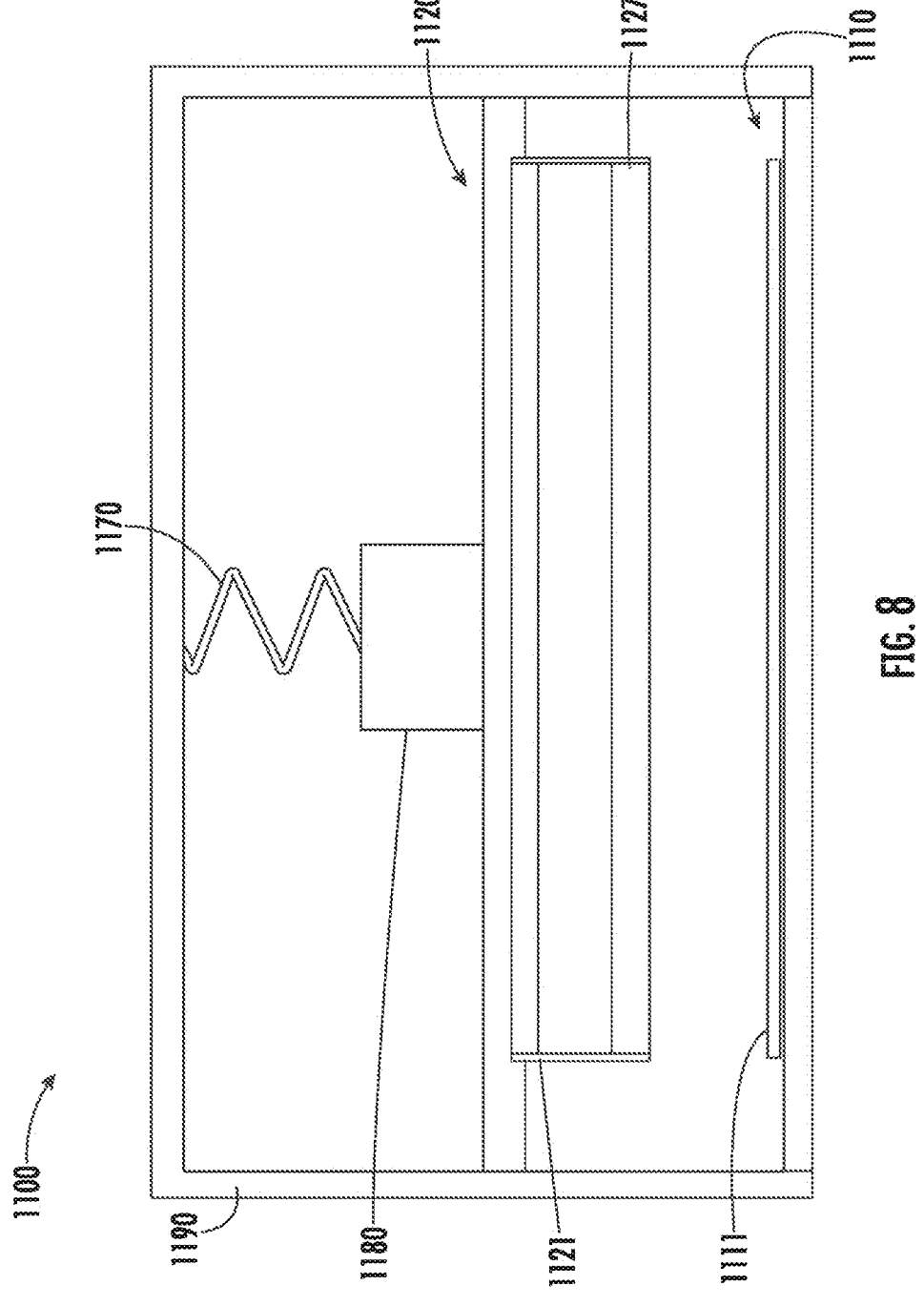
FIG. 8 illustrates a sensor application according to embodiments and teachings herein.

FIG. 8 illustrates an example sensor 1100 configured to measure acceleration in one or more directions. Like the sensor illustrated in FIG. 1, sensor 1100 comprises a light intensity pattern object 1120 including a pattern forming substrate 1111. A micro-lens array 1127 is interposed between light intensity pattern object 1220 and a light-measuring surface 1111 of an imaging device 1110. Sensor 1100 additionally includes a mass 1180 coupled to light intensity pattern object 1120. The mass 1180 and the light intensity pattern object 1120 are coupled to support structure 1190 by an elastic member 1170. Elastic member 1170 can comprise a spring which can be any suitable metal spring, elastomeric spring or other suitable elastic member to facilitate relative movement of imaging device 1110 and light intensity pattern object 1120 in one or more degrees of freedom of movement.

Although light intensity pattern object 1120 is shown in FIG. 8 as being associated with mass 1180 and suspended by elastic member 1170, other arrangements are within the scope of the disclosed embodiments. For example, imaging device 1110 rather than light intensity pattern object 1120 can be associated with, or coupled to mass 1180 and suspended from a support structure by elastic member 1170. In any arrangement, micro-lens array 1127 can be rigidly affixed to support structure 1190. Alternatively, micro-lens array 1127 can be rigidly affixed to imaging device 1110.

Figure 9:
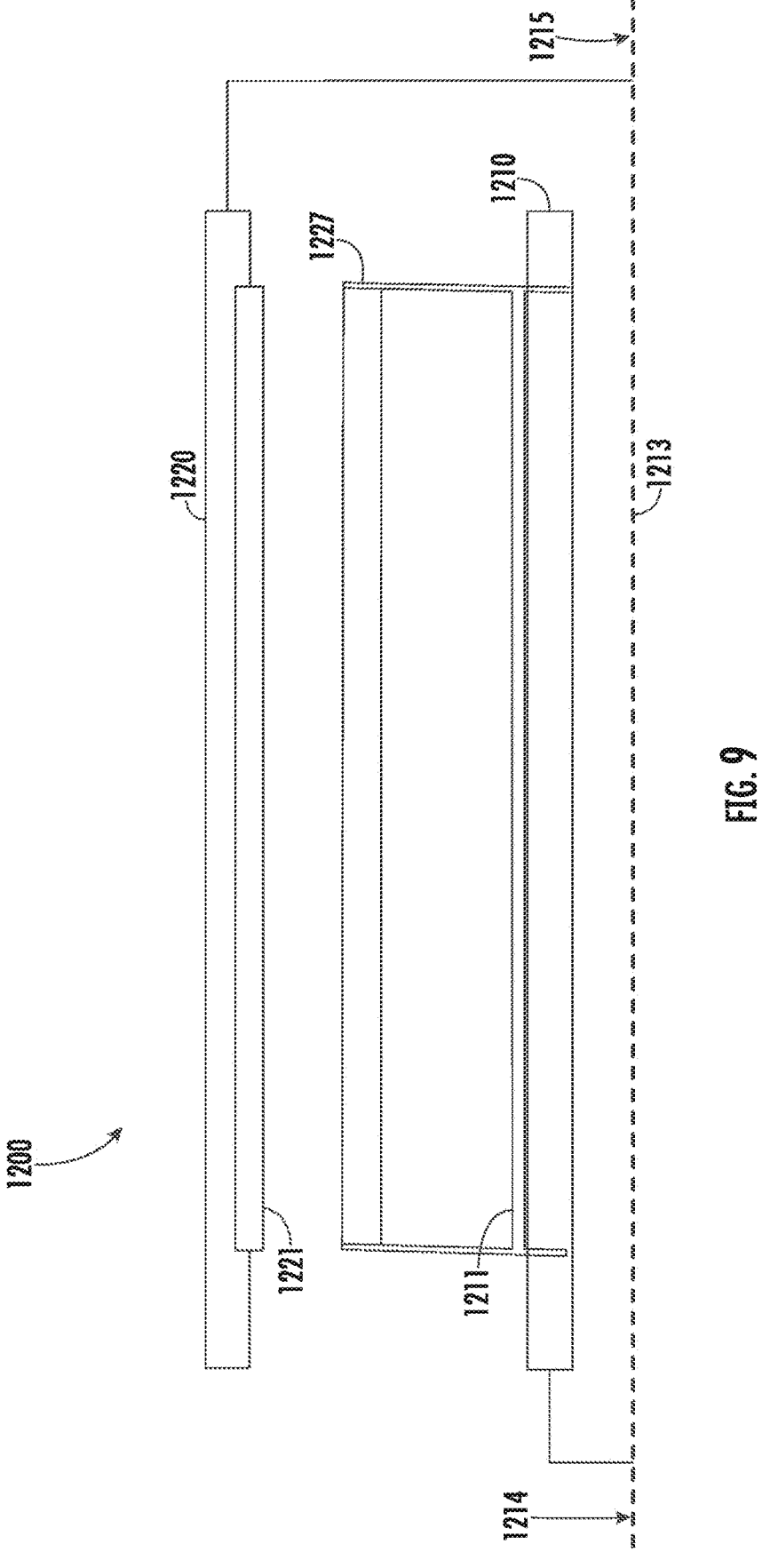
FIG. 9 illustrates a sensor application according to embodiments and teachings herein.

FIG. 9 illustrates a sensor 1200 configured as an extensometer to measure strain. In this example embodiment, imaging device 1210 is anchored to a surface 1213 at location 1214 and light intensity pattern object 1220 is anchored to surface 1213 at location 1215. As the surface 1213 experiences strain or warping forces, imaging device 1210 and the light object 1220 will move relative to one another. The displacement resulting from the movement can serve to facilitate measurement of the strain in one or more degrees of freedom. For example, in a given time interval displacement of imaging device 1210 with respect to light intensity pattern object 1220 in the region of location 1215 can be different than the displacement of imaging device 1210 with respect to light intensity pattern object 1220 in a region about location 1214. The difference in the displacements at region 1215 and region 1214 will be reflected in corresponding changes in position and size of light pattern portions included in the array of images formed on light-measuring surface 1211. In other words, a light pattern included in an image of light intensity pattern object 1220 captured before the time the strain or warping forces were experienced, will differ from the light pattern included in an image of light intensity pattern object 1220 captured after the strain or warping forces were experienced. The differences in the light intensity pattern portions in the first and second images, which are passed to the image registration processor 130 in FIG. 1, result in a measurement of displacement between the time the first and second images were acquired. In this example, this displacement can be used to measure strain or warping.

In this application, as with other applications disclosed herein, micro-lens array 1227 can be rigidly affixed to either the light intensity pattern object 1220 or the imaging device 1210 as shown in FIGS. 7A and 7B. It will be recognized by those skilled in the art that a strain gauge is merely one example type of sensor made possible by the technology discussed herein. As such, this particular application is not intended to be limiting in any way.

FIGS. 8 and 9 provide example embodiments of sensor 100 configured to measure acceleration, such as linear acceleration, and as an extensometer to measure strain. These examples are not meant to be limiting. For example, sensor 100 may be configured to measure a rate of rotation, such as measured by a gyroscope. Further, the sensor 100 may be configured to measure any one or more of strain, force, and torque.

FIGS. 10A to 10D illustrate relative translation and rotational motion of components of a sensor 1300 according to an alternative embodiment. Sensor 1300 includes all of the components described above with respect to FIG. 1 and is configured to measure any of a number of displacement-derived parameters including acceleration and strain. FIGS. 10A-10D show first and second housings, 1320 and 1310 that can for example, house the components of sensor 100 shown in FIG. 1. For example, first housing 1320 can house light intensity pattern object 120 (an example illustrated in FIG. 1). Second housing 1310 can house imaging device 110 (an example illustrated in FIG. 1). Micro-lens array 127 (an example illustrated in FIG. 1) can be rigidly affixed to light intensity pattern object 120 and housed in first housing 1320, or can be rigidly affixed to imaging device 110 and housed in second housing 1310.

In addition to the sensor components shown in FIG. 1, sensor 1300 further includes a transparent elastic member 1301 disposed between first housing 1320 (housing light intensity pattern object 110) and second housing 1310 (housing imaging device 110). In one embodiment, elastic member 1370 comprises a silicone layer 1301 configured to hold housing 1320 and 1310 in a spaced apart arrangement, thereby holding light intensity pattern object 120 and imaging device 110 in a corresponding spaced apart arrangement.

In an example implementation polymer layer 1301 comprises a polymer suspension thereby providing a polymer suspension system for imaging device 1310 and light intensity pattern object 1320. In one implementation, light intensity pattern object 1320 includes one or more light sources (an example illustrated in FIG. 1 at 122) and elastic member 1301 is disposed outboard of the one or more light sources 122.

In some embodiments, micro-lens array 227 is rigidly affixed to light intensity pattern object 120 as illustrated in FIG. 7A, or to a supporting substrate thereof. In that embodiment light intensity pattern object 120 and micro-lens array 227 can be co-housed within first housing 1320. In other embodiments, micro-lens array 227 is rigidly affixed to imaging device 110 as illustrated in FIG. 7B. In those embodiments imaging device 110 and micro-lens array 227 can be co-housed within second housing 1310.

Figures 10A, 10B:
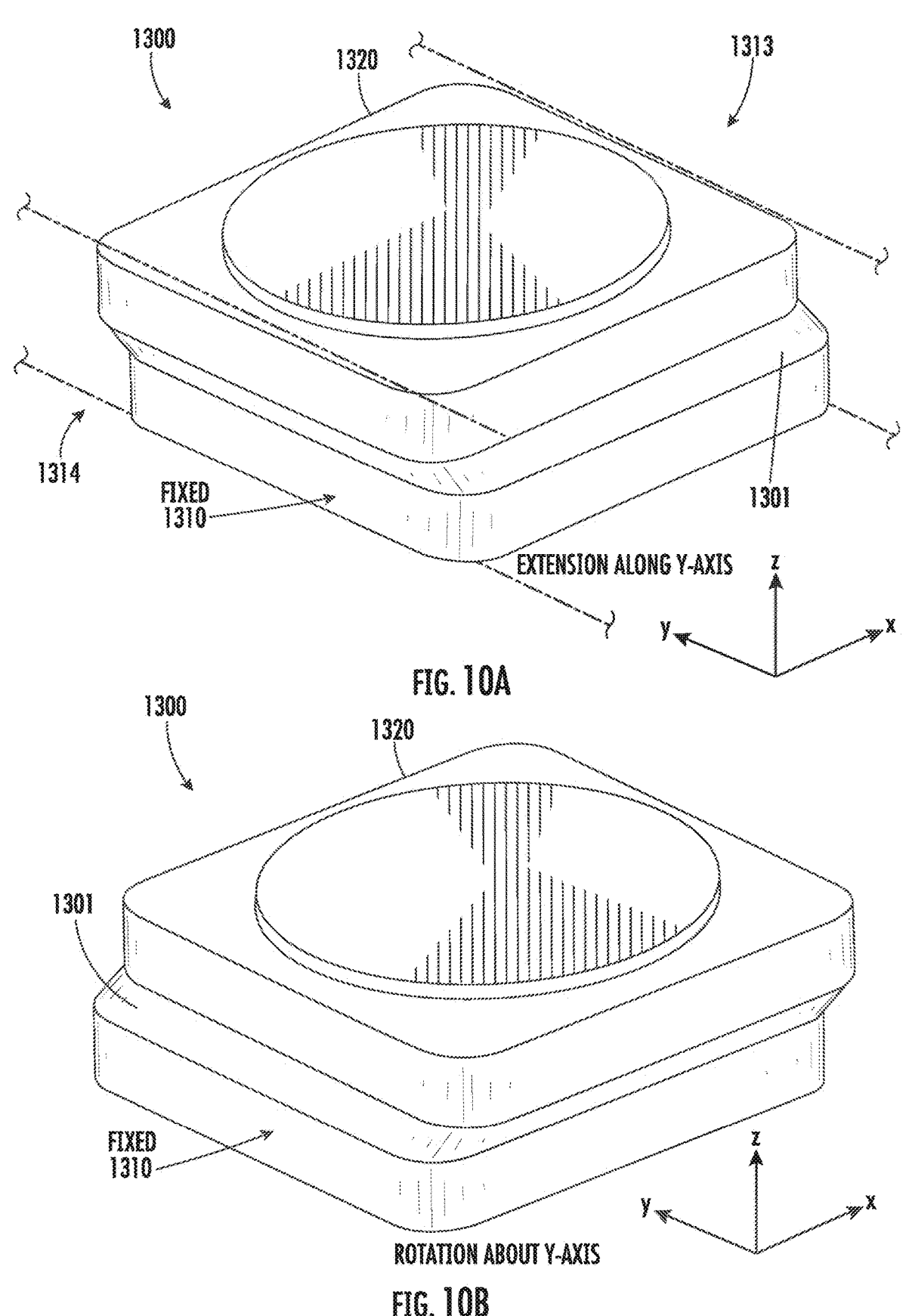
FIGS. 10A to 10D are perspective views of a sensor showing relative movement in several degrees of freedom of sensor components.
Figure 10C:
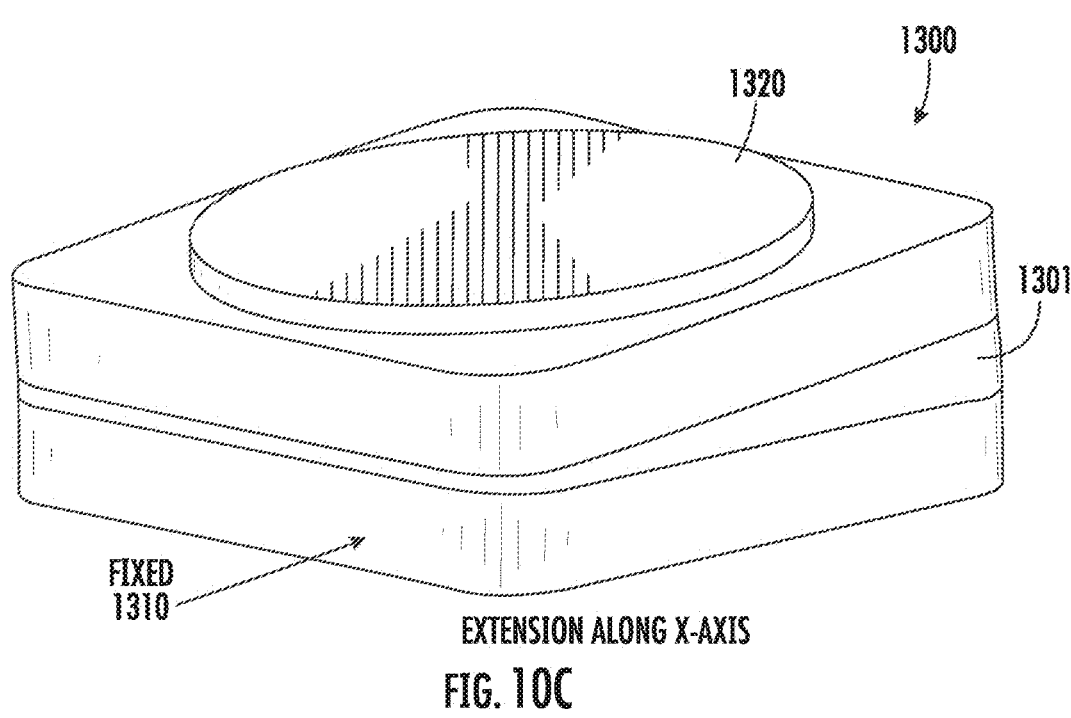
Figure 10D:
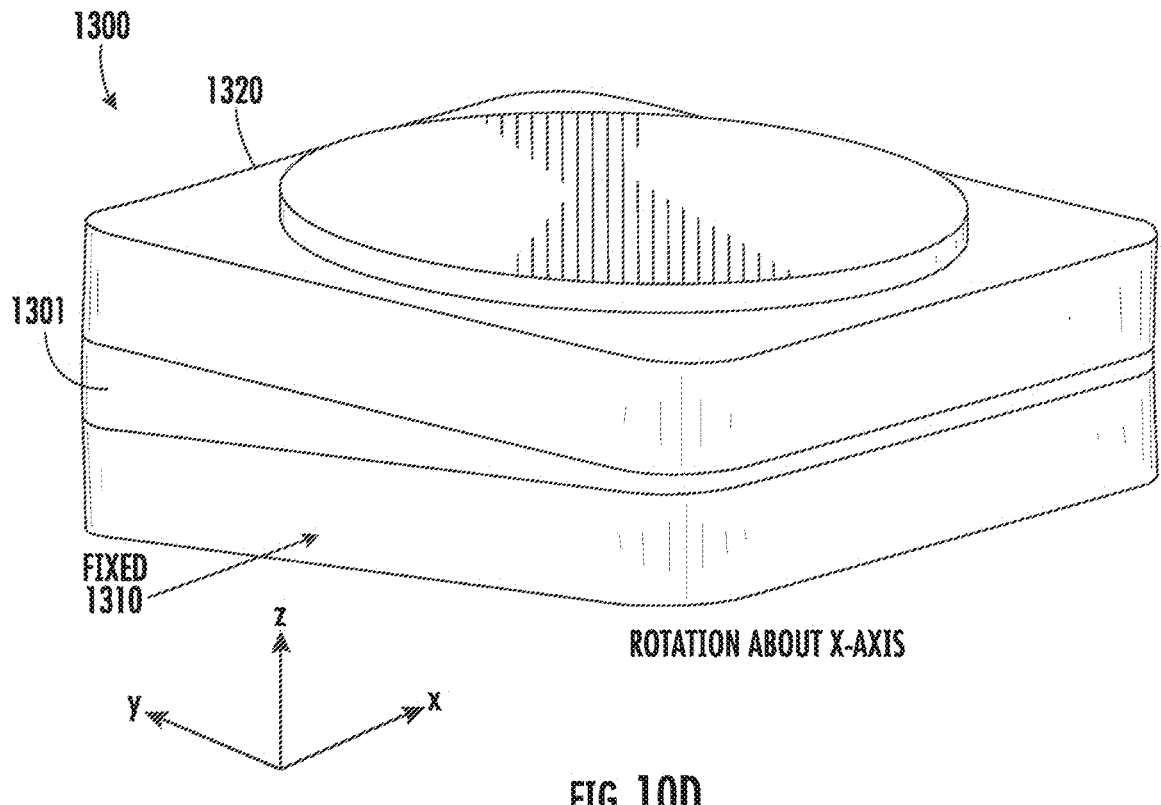

Polymer layer 1301 is compressible and expandable so as to facilitate relative movement of imaging device 1310 and light intensity pattern object 1320 with several degrees of freedom of movement. For example, FIG. 10A shows translation of light intensity pattern object 1320 with respect to imaging device 1310 along a Y-axis. FIG. 10B shows translation of light intensity pattern object 1320 with respect to imaging device 1310 along an X-axis. FIG. 10C shows rotation of light intensity pattern object 1320 about a y-axis with respect to imaging device 1310. FIG. 10D shows rotation of light intensity pattern object 1320 with respect to imaging device 1310 about the x-axis. Variations within the scope of the disclosed embodiments include those in which imaging device 1310 rather than light intensity pattern object 1320 translates or rotates as described above. Although not depicted, translation along the z-axis, rotation about the z-axis, or any combination of translation along or rotation about any of the three orthogonal axes are possible.

Transparent polymer layer 1301 can establish a nominal separation and orientation between first housing 1320 and second housing 1310, thereby establishing a corresponding nominal separation and orientation between light intensity pattern object 120 and imaging device 110. In some embodiments the nominal separation and orientation defines starting positions of light intensity pattern object 120 and imaging device 110, and displacement can be measured by reference to the nominal starting positions.

For example, first housing 1320 can be affixed to a first structure 1313, or portion thereof, and second housing 1310 can be affixed to a second structure 1314, or portion thereof. At the time of installation or affixing, imaging device 110 can capture one or more reference or calibration images of light intensity pattern object 120. During subsequent time periods, imaging device 110 can capture a sequence of images of light intensity pattern object 120. The images captured during the subsequent periods can be registered to the reference image (or images) that were captured earlier, thus producing an absolute displacement measurement from the time of installation thereby providing a more accurate registration and facilitating a higher resolution displacement measurement.

In some applications, first housing 1320 rigidly holding light intensity pattern object 120 therein, is affixed to a first structure 1313. Second housing 1310 rigidly holding imaging device 130 therein, is affixed to a second structure 1314. As noted above micro-lens array 227 can be rigidly held within either the first or second housing. Either the first structure, the second structure or both structures can move with up to six degrees of freedom. The motion of either or both structures exerts corresponding forces upon the first and second housings in any of up to six degrees of freedom of motion. Either or both the first and second housings, and thus either or both of light intensity pattern object 1320 and imaging device 1310, can move in response to these applied forces. As a result, corresponding forces will be exerted upon elastic layer 1301. Elastic layer 1301 is responsive to these forces in any one or more of six degrees of freedom of motion.

Regardless of the direction of relative displacement of first housing 1320 (and therefore light intensity pattern object 120) with respect to second housing 1310 (and therefore imaging device 110), and whether the micro-lens array 227 is rigidly affixed to the light intensity pattern object 120 (or to first housing 1320) or is instead rigidly affixed to imaging device 110 (or to second housing 1310), the components are arranged such that micro-lens array 227 forms sub-images of portions of the light intensity pattern object 120 and focuses the sub-images onto light measuring surface 111 of imaging device 110 (an example illustrated in FIG. 1) as a matrix of image elements, thereby facilitating registration of sensed images of light intensity pattern object 110 to provide high resolution displacement measurements. The position, size and/or shape of the pattern portions within the image elements can change from one sensed image to the next in accordance with changes in the orientation of first housing 1320 with respect to second housing 1310 due to forces exerted by displacement of the first structure with respect to the second structure, and the corresponding expansion and/or compression of various portions of elastic layer 1301.

Figure 11:
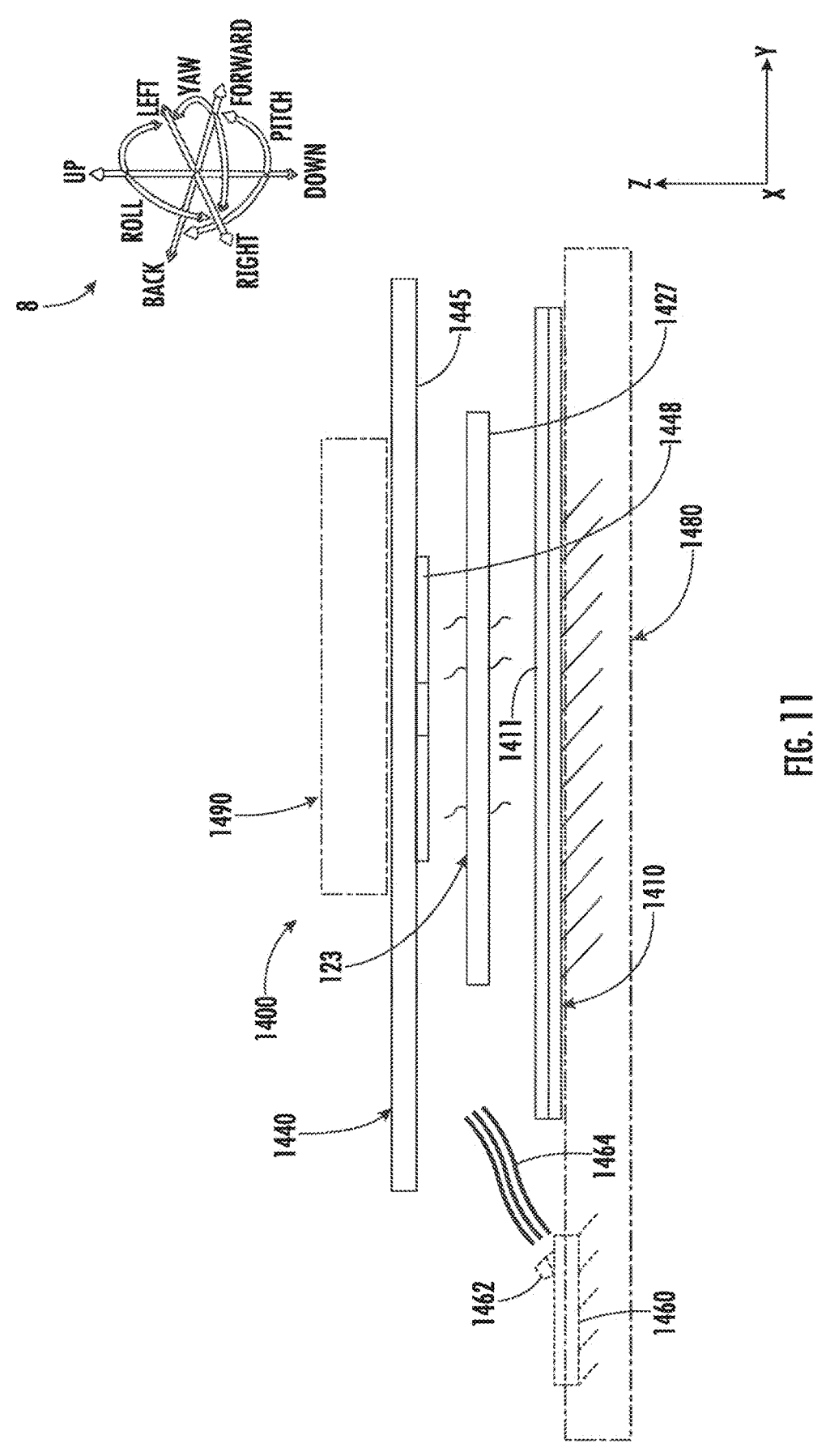
FIG. 11 illustrates a sensor configuration according to embodiments and teachings herein.

FIG. 11 illustrates a sensor 1400 in accordance with the present disclosure. Sensor 1400 comprises an imaging device 1410 including a light measuring surface 1411. Light measuring surface 1411 comprises an array of photo-sensor elements (an example illustrated in FIG. 5 at 1803). Imaging device 1410 is positioned proximate a pattern-forming substrate 1448. Pattern forming substrate 1448 is affixed to a support structure 1440. Pattern-forming substrate 1448 can move with up to six degrees of freedom as depicted at 8. A micro-lens array 1427 is disposed between the pattern-forming substrate 1448 and imaging device 1410. Micro-lens array 1427 can be rigidly affixed to either imaging device 110 as shown in FIG. 7B or to pattern-forming substrate 1448. In embodiments in which pattern forming substrate 1448 is rigidly affixed to support structure 1440 as shown in FIG. 7A, micro-lens array 1427 can be rigidly affixed to support structure 1440.

FIG. 11 depicts, among other things, an example implementation of light intensity pattern object 120 of sensor 100 depicted in FIG. 1. The light intensity pattern object 120 in FIG. 1 can comprise a light source 1462 supported by a light support structure 1460, wherein light source 1462 is operative to generate and direct light 1464 onto pattern-forming substrate 1448. In FIG. 11, light source 1462 is depicted stationary relative to imaging device 1410. Alternatively, although not depicted, light source 1462 may be configured such that it is stationary relative to pattern-forming substrate 1448. The light directed onto pattern-forming substrate 1448 is transmitted or attenuated according to a light intensity pattern. The light intensity pattern is sensed by photosensors of light measuring structure 1411 of imaging device 1410 for the purpose of determining relative movement between imaging device 1410 and pattern-forming substrate 1448.

In some example embodiments pattern-forming substrate 1448 comprises an excitable material. For example, pattern-forming substrate 1448 can comprise a fluorescent coating or material, wherein light source 1462 is operative with sensor 1400 to direct light (e.g., UV light) toward and onto pattern-forming substrate 1448 causing pattern-forming substrate 1448 to fluoresce and propagate light detectable as a light intensity pattern by imaging device 1410.

In one example embodiment, sensor 1400 is operable in ambient light (light that is dispersive and not necessarily directional in nature or supplied specifically for the purpose of facilitating operation of sensor 1400), wherein ambient light illuminates pattern-forming substrate 1448, or illuminates substrate material such that the light pattern formed by the pattern-forming substrate can be sensed under ambient light conditions. In one example, the light pattern formed by the pattern-forming substrate can be sensed by photo-sensors making up light-measuring surface 111 of imaging device 110 as depicted in FIG. 1. Ambient light can comprise natural light (e.g., the sun) or artificial light (powered light). The source of the ambient light can be located anywhere relative to the sensor. The intensity and/or other properties of the ambient light can be such that the substrate 1448 and features of the pattern are defined and identified so as to be recognizable to imaging device 1410.

Pattern forming substrate 1448 can be formed of a fluorescing material, or it can comprise a fluorescing coating. Light source 1462 can be located about a side of the sensor 1400 common with imaging device 1410, such that the light source 1462 and imaging device 1410 can be powered from a same common side. In one aspect, light source supporting structure 1460 supporting light source 1462 can comprise the same structure 1480 supporting imaging device 1410, or to which imaging device 1410 is affixed. In some embodiments, light source supporting structure 1460 is attached to a first structure 1480 whose displacement with respect to a second structure is to be measured. Structure 1440 can be attached to the second structure 1490. In other embodiments, structure 1460 and structure 1480 can comprise different structures.

In one aspect of the technology described herein, light source 1462 can comprise a UV light source operative to propagate light at a wavelength ranging from approximately 315 to 400 nanometers. In another aspect, the light source 1462 can emit UV light at wavelengths in the mid (290-315 nm) or far (190-290 nm) UV fields. Other types of luminescence methods and systems are contemplated for use on or with pattern-forming substrate 1448, such as phosphorescence, and chemiluminescence. In yet further embodiments, light source 1462 may illuminate a light diffuser attached to a mask, such as the example mask described above, that comprises opaque and transparent regions to generate a light intensity pattern. The above are merely examples and not meant to be limiting. A light source may be used in any suitable manner to illuminate an object and form a light intensity pattern.

Figure 12:
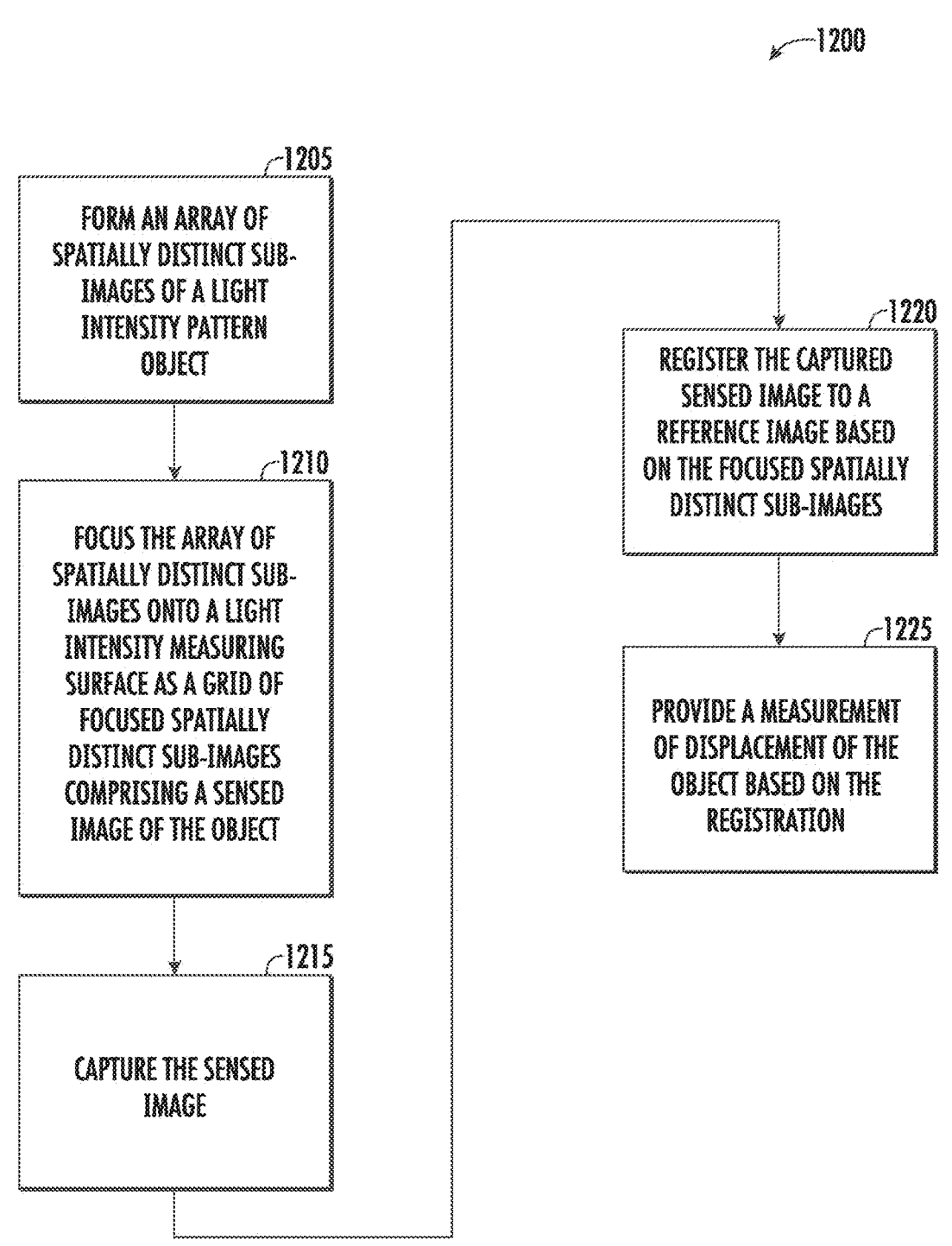
FIG. 12 is a flowchart illustrating a method for displacement measurement according to embodiments and teachings herein.

FIG. 12 is a flowchart illustrating a method 1200 according to an embodiment disclosed herein. At 1205 a micro-lens array forms a spatially distinct array of sub-images of a light intensity pattern object. At 1210 the micro-lens array focuses the spatially distinct array of sub-images onto a light measuring surface of an imaging device as a sensed image of the light intensity pattern object.

At 1215 the imaging device captures the sensed image of the light intensity pattern object. At 1220 an image registration processor of the imaging device registers at least one sensed image to a reference image based on pattern portions in the spatially distinct focused sub-images. In some embodiments, a subset of the spatially distinct focused sub-images may be used for registration, which can reduce computation time at a possible cost of lower resolution measurements.

At 1225, the registration processor provides a measurement of displacement of the light intensity pattern object relative to the imaging device based on the registration.

Figure 13:
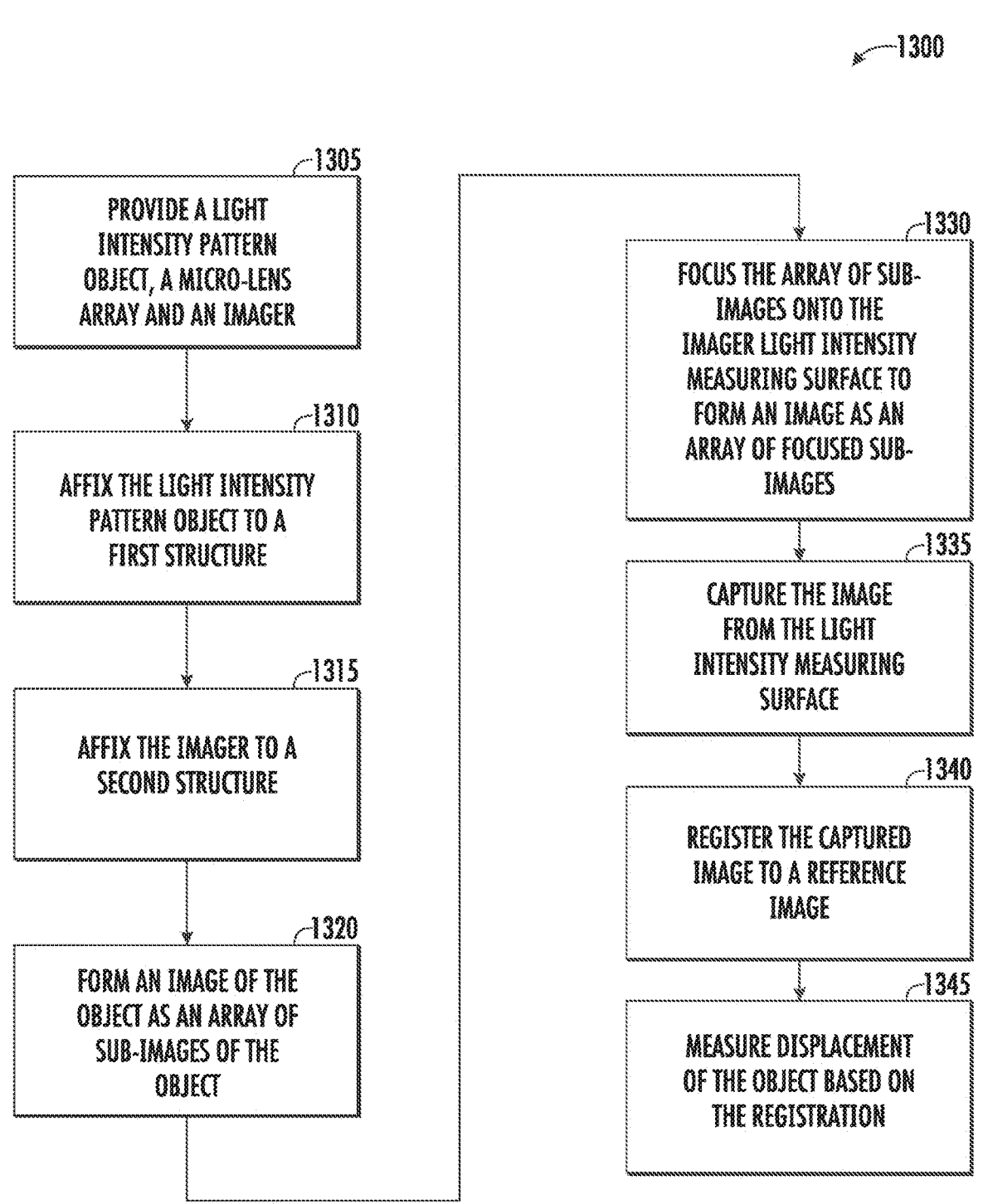
FIG. 13 is a flowchart illustrating a method for displacement measurement according to embodiments and teachings herein.

FIG. 13 is a flowchart illustrating a method 1300 according to an embodiment disclosed herein. At 1305 a light intensity pattern object, a micro lens array and an imager (also referred to herein as 'imaging device') are provided. Micro-lens array is disposed between the light intensity pattern object and the imager. Light intensity pattern object can be provided with the micro lens array affixed thereto. In alternative embodiments of method 1300 the provided imager can include the micro-lens array affixed thereto.

At 1310 the light intensity pattern object 120 is affixed to a first structure whose displacement with respect to a second structure is to be measured. At 1315 the imager is affixed to the second structure.

At 1320 the micro-lens array forms an image of the light intensity pattern object. The image comprises an array of spatially distinct sub-images.

At 1330 the micro lens array focuses the spatially distinct sub-images onto a light intensity measuring surface of the imager thereby forming a sensed image of the light intensity pattern object.

At 1335 the imager captures the sensed image from the light intensity measuring surface. At 1340 the imager registers the sensed image to a reference image to provide a measure of displacement of the light intensity pattern object from a position and/or orientation of the light intensity pattern object defined by the reference image In some embodiments, imager 110 captures over a time period, a sequence of sensed images of light intensity pattern object 120. In that embodiment the reference image can comprise a sensed image in the sequence of sensed images. In some embodiments the reference image is any image in the sequence of sensed images and the reference image can change from one time period to the next.

In some embodiments, a series of images may be used to calibrate sensor 100. For example, two images may be used that result from a known displacement, a known strain, or that result from a known acceleration. Through registration, the relative displacement between the two images may be used to calibrate the sensor 100 based upon the known displacement, strain, acceleration, etc.

Although the example embodiments of a sensor disclosed herein generally depict a light intensity pattern object used to produce a light intensity pattern that is directly viewed by a micro-lens array which then focuses the light intensity pattern as an image directly upon an imaging device, this is not meant to be limiting. Said, another way, light intensity pattern object is depicted as generally facing towards the imaging device. Instead, through the use of one or more mirrors, the light intensity pattern object could face in any orientation, including facing in a same direction that the imaging device is facing. In one example, using one or more mirrors, light intensity pattern object can be affixed to a same structure as the imaging device using one or more mirrors. In other examples, one or more mirrors could be used to reflect the light intensity pattern towards the micro-lens array. Additionally or alternatively, one or more mirrors could be used to reflect light from the micro-lens array so that it forms the image upon the imaging device.

It is to be understood that the embodiments of the disclosure are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment. A feature described with respect to an embodiment is not inextricably linked to that embodiment and the features described for that embodiment. Rather, a person of ordinary skill in the art recognizes features of an embodiment are readily combinable with features from other embodiments.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus for measuring displacement comprising:
a light intensity pattern object comprising a pattern forming substrate configured as a multi-dimensional array of light intensity pattern portions that define a light intensity pattern of the light intensity pattern object, each light intensity pattern portion comprising at least one relatively light part and at least one relatively dark part to define at least one edge in each light intensity pattern portion;
an imaging device including a light intensity measuring surface; and
a micro-lens array disposed between the light intensity pattern object and the light intensity measuring surface such that each respective micro-lens of the micro-lens array views a corresponding, respective portion of the light intensity pattern object as a sub-image, and each micro-lens of the micro-lens array focuses each respective sub-image onto the light intensity measuring surface such that the micro-lens array forms upon the light intensity measuring surface an array of focused sub-images forming a sensed image of the light intensity pattern object;
the imaging device configured to capture the sensed image and register the sensed image to a reference image of the light intensity pattern object based on light intensity pattern portions in the focused sub-images to thereby provide a measurement of displacement of the light intensity pattern object relative to the imaging device.

2. The apparatus of claim 1 wherein the imaging device is configured to register the sensed image to the reference image at least in part by an image registration algorithm that maps portions of the light intensity pattern in the focused sub-images to corresponding portions of the light intensity pattern in the reference image.

3. The apparatus of claim 1 wherein the micro-lens array is affixed to the light intensity pattern object.

4. The apparatus of claim 1 wherein the micro-lens array is affixed to the imaging device.

5. The apparatus of claim 1 wherein the pattern forming substrate defines a light intensity pattern unique for each displacement of the light intensity pattern object relative to the imaging device such that an image registration processor produces a single displacement solution for each possible displacement.

6. The apparatus of claim 1 wherein each respective sub-image corresponds to a central axis of a respective corresponding micro-lens in the micro-lens array such that each sub-image is spatially distinct from every other sub-image.

7. The apparatus of claim 1, wherein the light intensity pattern object includes a light source that produces diffuse light and a mask that includes transparent regions and opaque regions.

8. The apparatus of claim 1, wherein the light intensity pattern object includes a UV light source and fluorescing material, wherein the UV light source excites the fluorescing material.

9. The apparatus of claim 1, wherein the light intensity pattern object includes phosphorescence material.

10. The apparatus of claim 1, wherein the light intensity pattern object includes chemiluminescence material.

11. The apparatus of claim 1, wherein the light intensity pattern object includes at least a light emitting diode (LED) array or a quantum dot array.

12. The apparatus of claim 1, wherein the light intensity pattern object includes an array of light valves.

13. The apparatus of claim 1 wherein the light intensity pattern object and the imaging device are configured to measure a strain.

14. The apparatus of claim 1 wherein the light intensity pattern object and the imaging device are configured to measure a force.

15. The apparatus of claim 1 wherein the light intensity pattern object and the imaging device are configured to measure a torque.

16. The apparatus of claim 1 wherein the light intensity pattern object and the imaging device are configured to measure acceleration in one or more directions.

17. The apparatus of claim 1 wherein the light intensity pattern object and the imaging device are configured to measure a rate of rotation.

18. The apparatus of claim 1 wherein the light intensity pattern object and the imaging device are configured to measure a rotation angle.

19. The apparatus of claim 1 wherein the light intensity pattern object and the imaging device are configured to measure at least one of multi-axis forces or moments.

20. An apparatus for measuring relative displacement, the apparatus comprising:

an imaging device including a light intensity measuring surface;

a light intensity pattern object configured to propagate, toward the light intensity measuring surface, the light intensity pattern object comprising a pattern forming substrate configured as a multi-dimensional array of light intensity pattern portions that define a light intensity pattern of the light intensity pattern object, each light intensity pattern portion comprising at least one relatively light part and at least one relatively dark part to define at least one edge in each light intensity pattern portion, the light intensity pattern characterized by variations in light intensity along a cross section defined by one or more axes of a light pattern object coordinate system; and an array of micro-lenses disposed between the light intensity pattern object and the light intensity detecting surface such that each micro-lens in the array forms a sub-image of a corresponding portion of the light intensity pattern, the micro-lenses focusing the sub-images onto the light intensity measuring surface as an array of focused sub-images forming a sensed image of the light intensity pattern object;

whereby displacement of the light intensity pattern object relative to the imaging device can be determined by registering the sensed image to a reference image.

21. The apparatus of claim 20 wherein the array of micro-lenses is affixed to the light pattern object.

22. The apparatus of claim 20 wherein the array of micro-lenses is affixed to the imaging device.

23. The apparatus of claim 20 wherein each micro-lens comprises at least two lenses aligned on the same optical axis.

24. The apparatus of claim 20, wherein the light intensity pattern object includes a light source that produces diffuse light and a mask that includes transparent regions and opaque regions.

25. The apparatus of claim 20, wherein the light intensity pattern object includes a UV light source and fluorescing material, wherein the UV light source excites the fluorescing material.

26. The apparatus of claim 20, wherein the light intensity pattern object includes phosphorescence material.

27. The apparatus of claim 20, wherein the light intensity pattern object includes chemiluminescence material.

28. The apparatus of claim 20, wherein the light intensity pattern object includes at least a light emitting diode (LED) array or a quantum dot array.

29. The apparatus of claim 20, wherein the light intensity pattern object includes an array of light valves.

30. The apparatus of claim 20 wherein the light intensity pattern object and the imaging device are configured to measure a strain.

31. The apparatus of claim 20 wherein the light intensity pattern object and the imaging device are configured to measure a force.

32. The apparatus of claim 20 wherein the light intensity pattern object and the imaging device are configured to measure a torque.

33. The apparatus of claim 20 wherein the light intensity pattern object and the imaging device are configured to measure acceleration in one or more directions.

34. The apparatus of claim 20 wherein the light intensity pattern object and the imaging device are configured to measure a rate of rotation.

35. The apparatus of claim 20 wherein the light intensity pattern object and the imaging device are configured to measure a rotation angle.

36. The apparatus of claim 20 wherein the light intensity pattern object and the imaging device are configured to measure at least one of multi-axis forces or moments.

* * * * *